United States Patent
Beziaeva et al.

(10) Patent No.: US 12,020,443 B2
(45) Date of Patent: Jun. 25, 2024

(54) VIRTUAL PRODUCTION BASED ON DISPLAY ASSEMBLY POSE AND POSE ERROR CORRECTION

(71) Applicants: Nant Holdings IP, LLC, Culver City, CA (US); NantStudios, LLC, Culver City, CA (US)

(72) Inventors: Liudmila A. Beziaeva, El Segundo, CA (US); Gary Marshall, Culver City, CA (US); Adolfo Sanchez, Culver City, CA (US); Juan Alfredo Nader Delgado, Culver City, CA (US); Anthony DeMeo, Culver City, CA (US); Jennifer McSpadden, Culver City, CA (US); Shane Keeling, Culver City, CA (US)

(73) Assignees: Nant Holdings IP, LLC, Culver City, CA (US); NantStudios, LLC, Culver City, CA (US)

( * ) Notice: Subject to any disclaimer, the term of this patent is extended or adjusted under 35 U.S.C. 154(b) by 0 days.

(21) Appl. No.: 18/220,227

(22) Filed: Jul. 10, 2023

(65) Prior Publication Data
US 2024/0020851 A1    Jan. 18, 2024

Related U.S. Application Data

(60) Provisional application No. 63/458,412, filed on Apr. 10, 2023, provisional application No. 63/390,252, filed on Jul. 18, 2022.

(51) Int. Cl.
*G06K 9/36* (2006.01)
*G06F 3/14* (2006.01)
(Continued)

(52) U.S. Cl.
CPC .............. *G06T 7/20* (2013.01); *G06F 3/1423* (2013.01); *G06F 3/1446* (2013.01); *G06T 3/02* (2024.01);
(Continued)

(58) Field of Classification Search
CPC .... G06T 3/00; G06T 3/02; G06T 3/04; G06T 3/08; G06T 7/20; G06T 7/30; G06T 7/70;
(Continued)

(56) References Cited

U.S. PATENT DOCUMENTS 9,860,494 B2 * 1/2018 Johnson ................. G03B 21/13
10,466,835 B2 * 11/2019 Chen ..................... G06F 3/1423
(Continued)

OTHER PUBLICATIONS

KR 10-1906002 B1 (Soonchunhyang University Industry Academy Cooperation Foundation) Oct. 8, 2018 (Oct. 8, 2018).
(Continued)

*Primary Examiner* — Eric Rush
(74) *Attorney, Agent, or Firm* — Kilpatrick Townsend & Stockton LLP

(57) ABSTRACT

Systems, apparatus, and methods for rendering content based on display assembly pose are disclosed. In an example, motion capture data of a display of a plurality of displays is received, the display moving from a first physical pose to a second physical pose. The motion capture data is processed to determine the coordinates of the second physical pose. A transformation of the second physical pose of the display to a virtual pose of the display is generated. A virtual model of the plurality of displays is updated, the virtual model comprising the virtual pose of the display. The content is rendered on the updated virtual model.

40 Claims, 21 Drawing Sheets

(51) Int. Cl.
*G06T 3/02* (2024.01)
*G06T 7/20* (2017.01)
*G06T 7/30* (2017.01)
*G06T 7/70* (2017.01)
*G06T 13/40* (2011.01)

(52) U.S. Cl.
CPC .................. *G06T 7/30* (2017.01); *G06T 7/70* (2017.01); *G06T 13/40* (2013.01); *G06T 2207/30204* (2013.01); *G06T 2207/30244* (2013.01); *G06T 2215/16* (2013.01); *G09G 2300/026* (2013.01)

(58) Field of Classification Search
CPC .................. G06T 13/40; G06T 19/006; G06T 2207/30204; G06T 2207/30244; G06T 2215/16; G06F 3/011; G06F 3/1423; G06F 3/1446; G06V 20/20; H04N 13/111; H04N 13/117; H04N 13/339; H04N 13/344; H04N 13/349; H04N 13/351; G09G 2300/023; G09G 2300/026
USPC ....... 382/100, 103, 107, 141, 152–154, 254, 382/276, 287, 291, 293–296, 302, 325; 345/1.1, 1.3, 31, 33, 156–158, 418–420, 345/427, 619, 629, 630, 632–635, 638, 345/645, 648, 651, 656, 659; 348/46, 47, 348/51, 52, 135, 136, 383, 840
See application file for complete search history.

(56) References Cited

U.S. PATENT DOCUMENTS

| | | |
|---|---|---|
| 10,650,712 B2 * | 5/2020 | Chapman ................ G09G 3/32 |
| 2017/0022022 A1 | 8/2017 | Joly et al. |
| 2017/0220225 A1 | 8/2017 | Joly et al. |
| 2021/0020390 A1 | 7/2021 | Ragan et al. |
| 2023/0186552 A1 * | 6/2023 | Harr ........................ G06T 7/70 345/419 |

OTHER PUBLICATIONS

Qida Yu et al., 'A consistently fast and accurate algorithm for estimating camera pose from point correspondences', Measurement, vol. 172, pp. 1-9, Feb. 2021 [retrieved on Oct. 19, 2023]. Retrieved from: <URL: https://www.sciencedirect.com/science/article/pii/S0263224120313932>.

Lipu Zhou et al., 'An Efficient and Accurate Algorithm for the Perspecitve-n-Point Problem', 2019 IEEE/RSJ International Conference on Intelligent Robots and Systems (IROS), pp. 6245-6252, Nov. 1, 2019 pp. 6245-6252.

* cited by examiner

| | Test Data | Calculated Value (CV)) data |
|---|---|---|
| Distance between 2 poses (mm) | 2395.117210 | 2396.601829 |
| Relative rotation between 2 poses, Euler Angles Degrees | -0.482724<br>-41.687118<br>1.140060 | 0.578781<br>-41.718646<br>-0.956472 |

VIRTUAL PRODUCTION BASED ON DISPLAY ASSEMBLY POSE AND POSE ERROR CORRECTION

CROSS-REFERENCE TO RELATED APPLICATIONS

This application claims priority to U.S. Provisional Patent Application No. 63/390,252, filed Jul. 18, 2022, and entitled "VIRTUAL PRODUCTION BASED ON POSE ERROR CORRECTION," and U.S. Provisional Patent Application No. 63/458,412, filed Apr. 10, 2023, and entitled "VIRTUAL PRODUCTION BASED ON DISPLAY ASSEMBLY POSE," the contents of which are hereby incorporated by reference in their entirety for all purposes.

FIELD OF INVENTION

The field of the invention relates to virtual production.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

A virtual production, production of a movie, for example, generally involves a virtual stage that presents content related to a scene, a camera device that generates cinematographic data by capturing video of persons, objects, and the content, and a motion capture system that tracks the camera, the persons, and/or the objects. The content can be dynamic (e.g., video content that changes over time) and/or its presentation can be adjusted based on the tracking.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or units of, for example, data used to describe and claim certain embodiments of the inventive subject matter, are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases, such features may be considered within the scope of understanding of one skilled in the art. Thus, presentation of such background technologies should not be considered limiting.

BRIEF SUMMARY

Embodiments described herein include a method for rendering content based on display assembly pose. The method includes at least one processor receiving motion capture data of a display of a plurality of displays, the display moving from a first physical pose to a second physical pose. The at least one processor processes the motion capture data to determine coordinates of the second physical pose. The at least one processor generates a transformation of the second physical pose of the display to a virtual pose of the display. The at least one processor updates a virtual model of the plurality of displays, the virtual model comprising the virtual pose of the display. The at least one processor renders content on the display based on the updated virtual model.

Embodiments can further include a system comprising one or more processors; and one or more memory storing instructions that, upon execution by the one or more processors, configure the system to receive motion capture data of a display of a plurality of displays moving from a first physical pose to a second physical pose. The system can further process the motion capture data to determine coordinates of the second physical pose. The system can further update a transformation of the second physical pose of the display to a virtual pose of the display. The system can further update a virtual model of the plurality of displays comprising the virtual pose of the display. The system can further render content on the display based on the updated virtual model.

Embodiments can further include a non-transitory computer-readable medium including stored thereon instructions that, when executed by at least one processor, causes the at least one processor to perform operations including receiving motion capture data of a display of a plurality of displays, the display moving from a first physical pose to a second physical pose. The at least one processor processes the motion capture data to determine coordinates of the second physical pose. The at least one processor generates a transformation of the second physical pose of the display to a virtual pose of the display. The at least one processor updates a virtual model of the plurality of displays, the virtual model comprising the virtual pose of the display. The at least one processor renders content on the display based on the updated virtual model.

Embodiments can further include a computer-implemented method comprising the step of determining, by at least one processor, a first pose of a first display of a plurality of displays included in a display assembly, wherein the display assembly is configured to display content on the plurality of displays; determining, by the at least one processor, a virtual model of the display assembly, wherein the virtual model is stored in a computer readable memory and comprises a virtual representation of each one of the plurality of displays. Further the method may include determining, by the at least one processor, a transformation based on the first pose of the first display and on a first virtual representation of the first display in the virtual model and rendering by the at least one processor, the content on at least some displays of the plurality of displays according to the transformation and the virtual model.

Additionally, embodiments may include a system comprising one or more processors and one or more memory storing instructions that, upon execution by the one or more processors, configure the system to determine a first pose of a first display of a plurality of displays included in a display assembly, wherein the display assembly is configured to display content on the plurality of displays. The instructions may further configure the system to determine a virtual model of the display assembly, wherein the virtual model is stored in the one or more memory and comprises a virtual representation of each one of the plurality of displays. Further, the instruction may configure the system to determine a transformation based on the first pose of the first display and on a first virtual representation of the first display in the virtual model and render the content on at least some displays of the plurality of displays according to the transformation and the virtual model.

Embodiments may additionally include one or more non-transitory computer-readable storage media storing instructions that, upon execution on a system, cause the system to perform operations comprising: determining a first pose of a first display of a plurality of displays included in a display assembly, wherein the display assembly is configured to display content on the plurality of displays. The instruction may cause the system to determine a virtual model of the display assembly, wherein the virtual model is stored in a computer-readable memory and comprises a virtual representation of each one of the plurality of displays. The instruction may cause the system to determine a transformation based on the first pose of the first display and on a first virtual representation of the first display in the virtual model and render the content on at least some displays of the plurality of displays according to the transformation and the virtual model.

BRIEF DESCRIPTION OF THE DRAWINGS

FIG. 17 is a table representing a difference between a measured parameters and calculated parameters.

DETAILED DESCRIPTION

Figure 1:
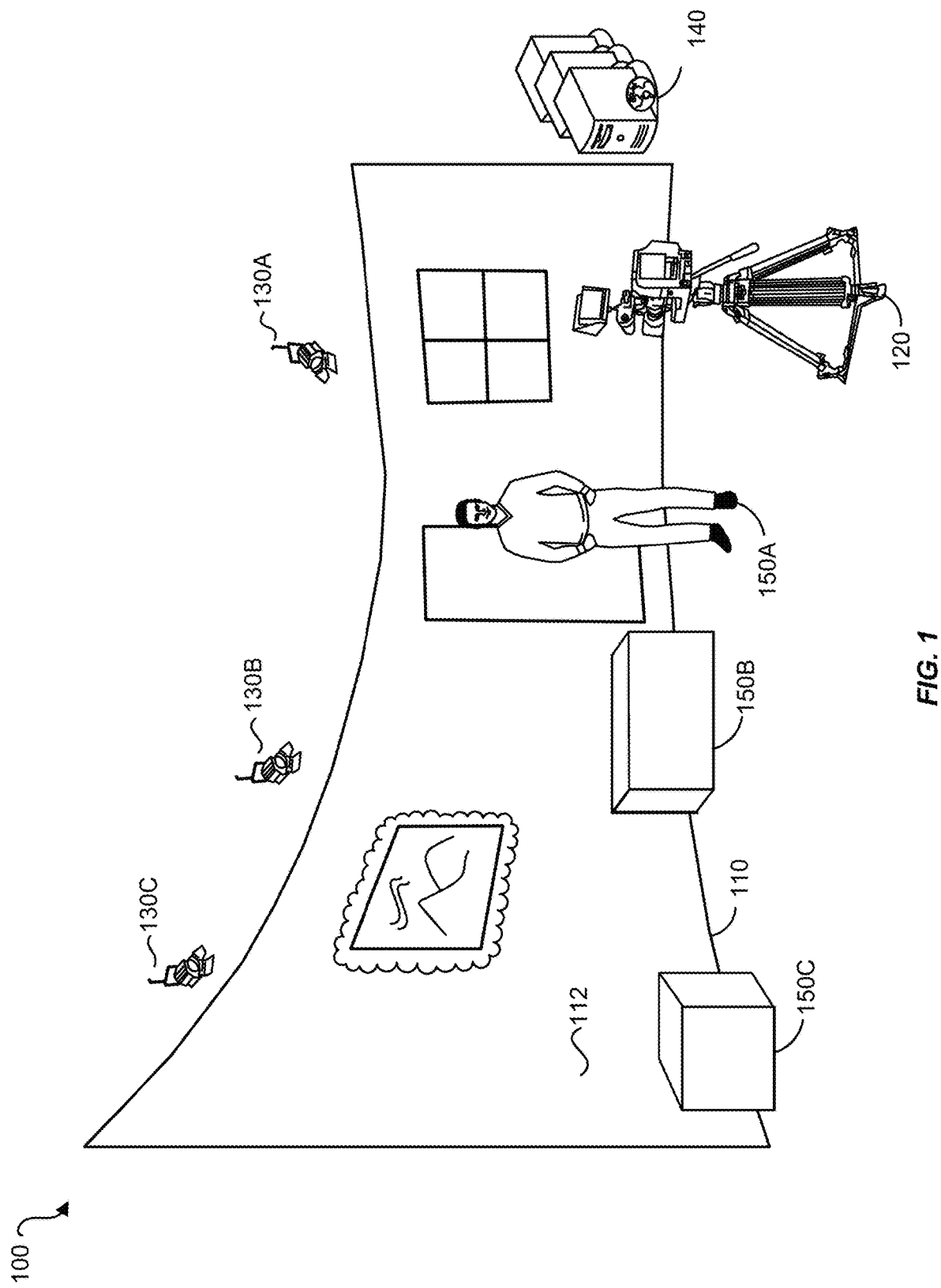
FIG. 1 illustrates an example of a virtual production system, in accordance with embodiments of the present disclosure.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer readable storage medium (e.g., hard drive, FPGA, PLA, solid state drive, RAM, flash, ROM, etc.). The software instructions or suite of software instructions configure or program the computing device or their processors to provide the roles, responsibilities, or other functionality as discussed below with respect to the disclosed apparatus or systems. Further, the disclosed technologies can be embodied as a computer program product that includes a non-transitory computer readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or other type of packet-switched network; a circuit-switched network; cell-switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated that the combination of software and hardware working in concert create a dedicated set of physical, real-world structures that provide utility to one or more users that would not exist outside the scope of the physical, real-world assets.

One should appreciate that the disclosed techniques provide many advantageous technical effects, including improving the modeling of a physical display assembly and improving the rendering of content on at least some displays of the physical display assembly. For instance, the accuracy of a virtual model that represents the physical display assembly is improved by relying on pose measurements of the physical display assembly. Because the virtual model's accuracy is improved, content rendering that uses the virtual model is also improved, whereby the presentation of the content is more accurately located on the displays, for instance.

Embodiments of the present disclosure are directed to, among other things, rendering content based on a virtual model that represents a real-time pose of a display assembly. In an example, the display assembly includes multiple configurable displays, each located in a particular pose within the display assembly (e.g., at a particular physical position and a particular rotation) within the display assembly. The pose of each display can be configurable to suit a desired virtual production. For example, a display can have six degrees of freedom and, for example, be mechanically rotated, moved forward, moved backwards, or tilted. In comparison, the virtual model includes a virtual representation of each display, where the virtual representation of a display within the virtual model indicates a real-time virtual pose that corresponds to the display's real-time physical pose. By updating the virtual model to reflect the current pose of each display of the display assembly, the quality of the virtual production can be improved.

By updating the virtual model to reflect the current pose of each display of the display assembly, the quality of the virtual production can be improved.

A display of the display assembly can be moved from a first physical pose to a second physical pose. For example, a display can be connected to an actuator, such as a winch, and be repositioned from the first physical pose to the second physical pose. A virtual marker can be projected onto the display. Based on the detection of the repositioning, a motion capturing system can be initialized to gather motion data using the virtual marker. The movement of the display can be detected by one or more image-capturing devices using the virtual marker.

The initialization of the motion capturing system can be based on either manual initialization or a sensor-based responsive initialization. The manual initialization can be performed by a user. For the sensor-based initialization, one or more sensors can be directed towards the display assembly and continuously gather streaming data. An algorithm, such as a forgetting factor-based change point detection algorithm can process the streaming data to determine that a change in one or more parameters (e.g., rotation of a display) of the display assembly have occurred.

The forgetting factor-based change point detection algorithm can be used to detect change points from the streaming data. Some streaming applications for change point detection can require that two or more parameters be selected for change point detection. However, the parameter selection can be based on a predicted size of the changes and the selection may not be optimal for streaming data, in which multiple change sizes can occur. Therefore, the forgetting factor-based change point detection algorithm, which only requires the selection of a single parameter, can be used.

Based on the motion data captured by the motion capturing system, the second physical pose can be determined by a computer system. In some instances, the repositioning of the display can occur during the shooting of a virtual production. In these instances, the second pose can be determined either after the display has stopped moving, or a current real-time physical pose of the display can continuously be determined as the display is moving.

To account for a shift in the location or orientation of a display of the display assembly, a fitting model is used to generate a transformation, where the current physical pose is used to determine a current virtual pose (e.g., after shift in is input to the fitting model). For instance, the fitting model can execute an implementation of one or more fitting algorithms; a Levenberg-Marquardt nonlinear least squares algorithm, a chi-square test algorithm, a curve fitting algorithm, a weighted least square fittings algorithm, a polynomial regression algorithm, a Gauss-Newton algorithm, shift-cutting algorithm, a gradient algorithm, or a Nelder-Mead (simplex) search algorithm for example. Different techniques are possible to determine the physical poses. In an example technique, the motion capture system is used to generate motion capture data that tracks a virtual marker presented on the display being moved. The motion capture data is correlated with the display being moved (e.g., first motion capture data that is a first portion of the motion capture data is associated with a display of the display assembly that is being moved. The current pose of a display (e.g., the pose after the display is moved) is derived from the portion of the motion capture data associated therewith.

Further, embodiments of the present disclosure are directed to, among other things, rendering content based on correcting pose errors (e.g., position errors and/or rotation errors) of a virtual model that represents a display assembly. In an example, the display assembly includes multiple displays, each located in a particular pose within the display assembly (e.g., at a particular physical position and a particular rotation) within the display assembly. In comparison, the virtual model includes a virtual representation of each display, where the virtual representation of a display within the virtual model indicates a virtual pose that corresponds to the physical pose. Due to different factors (e.g., installation tolerances, incorrect installation, operational temperature, heat, thermal expansion, and the like), a mismatch may exist between the virtual pose and the physical pose. The mismatch can cause quality issues when content is rendered based on the virtual model for presentation on the display assembly. By correcting pose errors, the mismatch can be reduced or even eliminated, thereby mitigating the quality issue.

To correct for the pose errors, a fitting model is used to generate a transformation, where the physical poses and the virtual poses are input to the fitting model. For instance, the fitting model can execute an implementation of one or more fitting algorithms; a Levenberg-Marquardt nonlinear least squares algorithm, a chi-square test algorithm, a curve fitting algorithm, a weighted least square fittings algorithm, a polynomial regression algorithm, a Gauss-Newton algorithm, shift-cutting algorithm, a gradient algorithm, or a Nelder-Mead (simplex) search algorithm for example. Different techniques are possible to determine the physical poses. In one example technique, a motion capture system is used to generate motion capture data that tracks a physical marker placed at locations on the displays according to a predefined motion path. In another example technique, rather than tracking a physical maker, the motion capture system is used to generate motion capture data that tracks a virtual marker presented on the displays according to a presentation path. In both example techniques, the motion capture data is correlated with the displays (e.g., first motion capture data that is a first portion of the motion capture data is associated with a first display of the display assembly, second motion capture data that is a second portion of the motion capture data is associated with a second display of the display assembly, and so on). The physical pose of a display is derived from the portion of the motion capture data associated therewith by, for instance, determining coordinates and a rotation of the marker (physical or virtual) and including such data in the physical pose.

Different techniques are also possible to generate the transformation. A first example technique, referred to herein as a global determination, uses the full set of the physical poses and the full set of the virtual poses as input to the fitting model. A second example technique, referred to herein as a localized determination, uses instead a subset of the physical poses and the corresponding subset of the virtual poses. For instance, the presentation of the content on the display assembly can be based on one or more parameters of a camera device (e.g., its pose) that generates video data showing the content. A subset of the displays may be in the field of view of the camera device, whereas the remaining displays may be outside of the field of view. In this illustration, only the physical poses of the displays included in the subset and their corresponding virtual poses are input to the fitting model. The physical and virtual poses of the remaining subsets are excluded from the input. In this way, the transformation is optimized locally by considering only the relevant pose data (e.g., the position and/or rotation data of the displays that are within the field of view). Generally, the localized determination technique uses a subset of displays, where the subset is localized based on the one or more parameters of the camera device. The subset can be defined, for instance, in the X-Y plane by including "x" by "y" displays, where "x" is smaller than the total number of displays along the horizontal axis ("$x_{total}$") and/or "y" is smaller than the total number of displays along the vertical axis ("$y_{total}$"). For instance, the subset can be a vertical stack or a column of displays (e.g., "x" equals one "1" and "y" equals "$y_{total}$"), a horizontal strip or a row of displays (e.g., "x" equals one "$x_{tot}$" and "y" equals "1"), a diagonal strip of displays, a contiguous block of "x" by "y" displays, a non-contiguous block of "x" by "y" displays (e.g., a first display and a second display are part of the block, but a display in between these two displays is not part of the block), and the like. By using a localized subset of displays, fine-grained adjustments can be made to the transformation such that this transformation is optimized to reduce pose errors in specific dimensions, which may correspond to specific camera work or movement.

In the interest of clarity of explanation, various embodiments of the present disclosure are described in connection with a virtual production use case, where content is presented on a virtual stage based on a virtual model of the virtual stage. However, the embodiments are not limited as such and equivalently apply to other use cases, such as virtual reality, augmented reality, mixed reality, content projection (e.g., in-home theaters, movie theatres, or buildings, etc.), a performance stage (e.g., a music concert), and the like. Generally, embodiments of the present disclosure allow improvements to content presentation on a display assembly, where this presentation relies on a virtual model of the display assembly. In particular, embodiments disclose techniques for updating a virtual model for a virtual production based on a movement of a display element. Additionally, or alternatively, embodiments disclose techniques for reducing the pose errors between the actual physical pose of display elements of the display assembly and the virtual poses that correspond thereto. A display element can be an actual display represented as a rigid body in the virtual model. Additionally or alternatively, a display element can be a sub-division of a display (e.g., a section thereof), where the sub-division is also represented as a rigid body in the virtual model.

Also, in the interest of clarity of explanation, various embodiments of the present disclosure are described in connection with positions (in real-world and virtual spaces), position errors, and correcting the position errors. However, these embodiments are not limited as such and equivalently apply to rotations (in real-world and virtual spaces), rotation errors, and correcting rotation errors. These embodiments also apply to poses, where a pose is a combination of a position and a rotation. A position error and/or a rotation error may exist (e.g., in a pose), and a position error correction and/or a rotation error correction may be made.

FIG. 1 illustrates an example of a virtual production system 100, in accordance with embodiments of the present disclosure. As illustrated, the virtual production system 100 includes, among other things, a display assembly 110, a camera device 120, motion capture devices 130A, 130B, 130C (generally referenced to with the numeral "130"), and a computer system 140. The display assembly 110 can be configured as a virtual stage that presents content 112 and that defines a volume where the camera device 120 is located (a plurality of such camera devices 120 is also possible). The presentation of the content 112 can be controlled by a game engine (e.g., UNITY game engine, UNREAL game engine, etc.) executing on the computer system 140. For instance, the content 112 itself and/or parameters of the presentation (e.g., panning, angling, skew, etc.) can be controlled based on a number of factors. Among these factors are the pose of the camera device 120 in the volume. The motion capture devices 130 can generate motion capture data that is processed to determine not only poses of objects 150A, 150B, 150C (generally referenced to with the numeral "150" and can be actors, stage furniture, scene furniture, equipment, and the like), but also the poses of the camera device 120 over time. Such motion capture data can be processed and used to control the content's 112 presentation on the display assembly 110.

In an example, the display assembly 110 includes a plurality of displays that are arranged to form a content presentation screen. An example of such arrangement is further described in FIG. 2. A position and orientation of each display can be configurable, such that a display or set of displays of the display assembly can be moved from a first pose to a second pose. The content presentation screen can have different shapes (e.g., curved, flat intersecting surfaces, etc.) and can surround an area where the objects 150 can be located, thereby defining a volume. In some instances, one or more displays are moved to cause the content presentation screen from having a first shape to having a second shape. The content presentation screen can be used to present an interactive, dynamic scene. The objects 150 can interact with such a scene and the content 112 can be updated based on the interaction (e.g., an actor 150A can interact with a virtual object presented in the content 112). Although the display assembly 110 is illustrated as having a vertical position (e.g., setup as a wall), the display assembly 110 (or a second display assembly) can be additionally or alternatively positioned in other positions (e.g., a horizontal position to define a ceiling or a floor). Further, the volume can include a sliding set of displays that can be moved in and out of the volume to define a particular geometry. For instance, the volume can be shaped as a horseshoe and the sliding set can be positioned to close off the open part of the horseshoe. In this way, the camera device 120 in the volume can be surrounded with a full 360 degrees of displays. Other shapes are possible, whereby the volume can be a half dome, a full sphere (i.e., $4\pi$ steradians), a cylinder, a cube, for example.

The camera device 120 can be a cinematic camera mounted on a rig (e.g., floor and/or ceiling rig) that can be re-positioned in the volume, or a moveable rig (e.g., tripod, gimble, etc.). In this way, the camera device 120 can be configured to shoot a scene by generating video data (and, optionally, audio data) showing one or more of the objects 150 and/or a portion of or the entire content 112 presented on the display assembly 110, especially from more than on perspective. The camera device 120 can have a high resolution (e.g., 4K, 6K, 8K, 12K, etc.) and available from, for instance, BLACKMAGIC (e.g., URSA MINI PRO 12K, STUDIO CAMERA 4K PLUS, STUDIO CAMERA 4K PRO, URSA BROADCAST G2, etc.), ARRI (e.g., ALEXA MINI LF, ALEXA LF, ALEXA MINI, ALEXA SXT W, AMIRA, AMIRA LIVE, ARRI MULTICAM SYSTEM, etc. with an ARRI SIGNATURE PRIME 35 mm T1.8 lens, an ARRI SIGNATURE PRIME 75 mm T1.8 lens, etc.), etc.

The motion capture devices 130 can be motion capture cameras (e.g., infrared cameras) and/or other type of motion sensors (e.g., depth sensors) that are a part of a motion capture system configured to track motions in the volume. The motion capture system can be available from, for example, VICON (e.g., using VANTAGE, VERO, VUE, VIPER, VIPERX cameras, etc. and SHOGUN software, etc.) or OPTITRACK (e.g., using PRIME-X 41, PRIME, SLIM-X, SLIM, FLEX cameras, etc. and UNREAL PLUGIN, UNITY PLUGIN, MOTION BUILDER PLUGIN, OPTICAL MOTION CAPTURE SOFTWARE, MAYA PLUGIN software, etc.). A motion of an object can be tracked by using, optionally, a motion tracker attached to the object. The tracking can involve locating the object in the volume by determining the positions and rotations of the object over time. A coordinate system (e.g., a Cartesian coordinate system or any other coordinate system) of the motion capture system can be defined relative to any origin in the volume.

The computer system 140 can be configured to process at least some of the motion capture data and, optionally, some of the video data. For example, the game engine can use a virtual model of the display assembly 110 and position data of the camera device 120 to render the content 112. The rendering can include using a rendering engine and involve synthesizing images and/or image frames (e.g., two-dimensional or three-dimensional) that are then presented on the display assembly 110 as the content 112. In addition to displaying the content 112, one or more displays of the display assembly 110 can be configured to generate virtual light to illuminate one or more production elements. The rendering of content can be affected by the physical pose of each display. Therefore, in order for the content to have a desired effect, the virtual model can be updated to include a current virtual pose each display.

Figure 2:
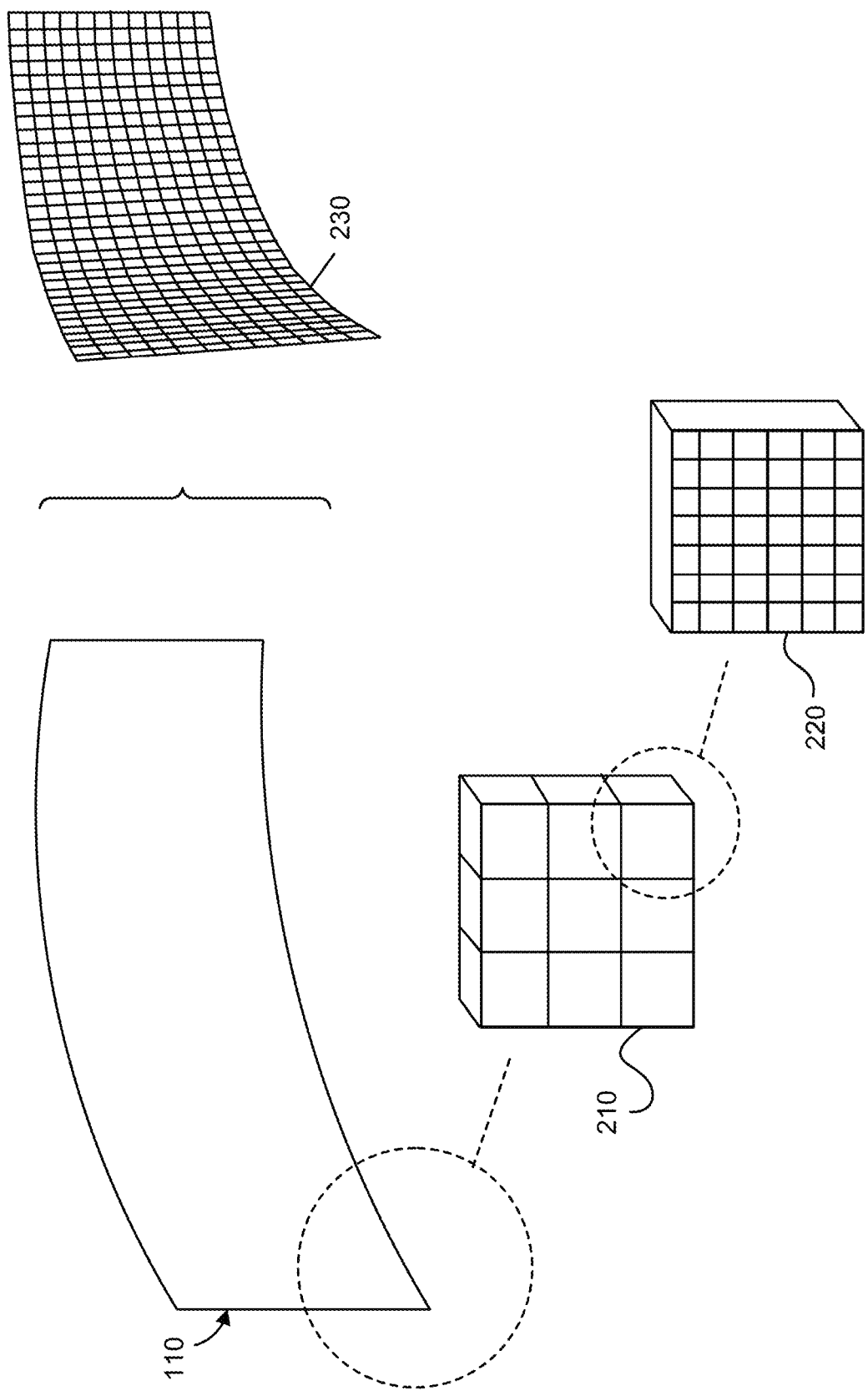
FIG. 2 illustrates an example of a display assembly and a virtual model thereof, in accordance with embodiments of the present disclosure.

FIG. 2 illustrates an example of a display assembly 110 and a virtual model 230 thereof, in accordance with embodiments of the present disclosure. The display assembly 110 can include an arrangement 210 of a plurality of displays. Each display 220 can be a plate having a particular shape and be individually controllable to display content. The display assembly 110 can form a volume for virtual production. This volume can include about 2,230 $m^2$ of virtual production space, where the display assembly 110 forms a curved LED wall that is about 16 m wide by 20 m long in a 270-degree oval shape (with a possible 360 degrees configuration).

In an example, a display 220 is a light-emitting diode (LED) plate having a flat screen that displays the content. The flat screen can have a square shape and a particular pixel resolution (as illustrated with the grid on the display 220 in FIG. 2, where each cell in the grid represents a pixel). Nonetheless, other curvatures and/or shapes of the screen and underlying technology of the display 220 (e.g., liquid crystal display-LCD) are possible. In a particular illustrative use case, the display is a BLACK PEARL 2 display available from ROE CREATIVE DISPLAY. In this illustrative use case, the screen is a flat panel with dimensions of 500×500×90 mm (height×width×depth), a 176×176 resolution (horizontal×vertical), a 2.84 mm pixel pitch, a LED surface mounted diode (SMD) configuration, a magnesium frame with magnetic connectors and a lock system. Although each display 220 has a solid, well-defined geometry, the installation of the large number of displays 220 to form the display assembly 110 according to a desired shape along multiple degrees of freedom (e.g., 6 DOF to form a 270-degree curved wall that is 16 m wide by 20 m long) may result in pose offsets that need to be accounted and corrected for in the virtual model of the display assembly.

Each display 220 can further be coupled to an actuator (e.g., a winch system, a motor, a robotic arm) for moving the display 220 from a first physical pose to a second physical pose. From time to time during a virtual production, one or more displays may be moved to create a desired effect for the content being displayed on the display assembly. For example, the shape of the display assembly can be changed for a desired shot for a virtual production. In other examples, a single display can be moved to create a desired effect for a shot. In each instance, moving a display 220 can change the visual parameters of the content being displayed on or around the display 220. Therefore, in order to display a desired content with a desired effect, a computer system (e.g., the computer system 140 of FIG. 1) can use a virtual model that includes virtual poses that are accurate representations of the current physical poses of each display.

The arrangement 210 can include a stacking of displays to form a particular geometry of the display assembly 110. For instance, the displays are installed adjacent to each other to form a desired curvature, height, and length of the display assembly 110. Each display has a physical pose (i.e., actual, real-world pose) in the arrangement 210. The physical pose can be defined for a point on the display (e.g., the top left corner, the center, etc.) relative to an origin (e.g., the origin of the coordinate system used by the motion capture system) in the production volume.

The virtual model 230 can include a three-dimensional object that represents the display assembly 110 as a rigid body in the game engine. The three-dimensional object can also represent each display as a rigid body by including a virtual representation thereof (e.g., as a three-dimensional sub-object). As such, the virtual model 230 can be a virtual representation of not only the display assembly 110, but also virtual representations of the displays that form the display assembly. As a part of the virtual representations, the virtual model 230 can indicate a virtual shape, virtual dimensions, and a virtual pose (e.g., position and rotation) for each display within the three-dimensional object. In the illustration of FIG. 2, the virtual representation is shown as a curved mesh that mimics the display assembly 110, where each cell in the mesh represents one of the displays.

The virtual model 230 may match the arrangement 210, where the virtual poses of the virtual representations of the displays in the virtual model 230 match the actual physical poses of the displays in the arrangement 210. However, due to a number of factors (e.g., installation tolerances, incorrect installation, operational temperature, heat, thermal expansion, human interactions, forces of nature, and the like), mismatches between the virtual positions and the physical positions and/or between the virtual rotations and the physical rotations may exist. Such mismatches can possibly result in alignment errors when rendering content on the displays, especially from the perspectives of the cameras.

In some instances, the current physical pose of a display is determined after the display stops moving. In these instances, the resting physical pose of the display 220 can be determined after the display 220 stops moving. Once the resting physical pose is determined, a fitting model can be used to determine a current location and orientation of the display 220. A transformation function can be applied to update the virtual model to include a virtual pose for the display that represents the current resting physical pose of the display 220. In other instances, the current physical pose of the display 220 can be determined in real-time as the display 220 is moving. In these instances, the current physical parameters of the display 220 can be continuously updated and input into the fitting model. The fitting model can continuously output a virtual model that includes a current virtual pose of the moving display 220. In these instances, the current physical parameters can stop being used as inputs once the display 220 stops moving, or a after a brief time interval (e.g., a few seconds) after the display 220 stops moving.

Figure 3:
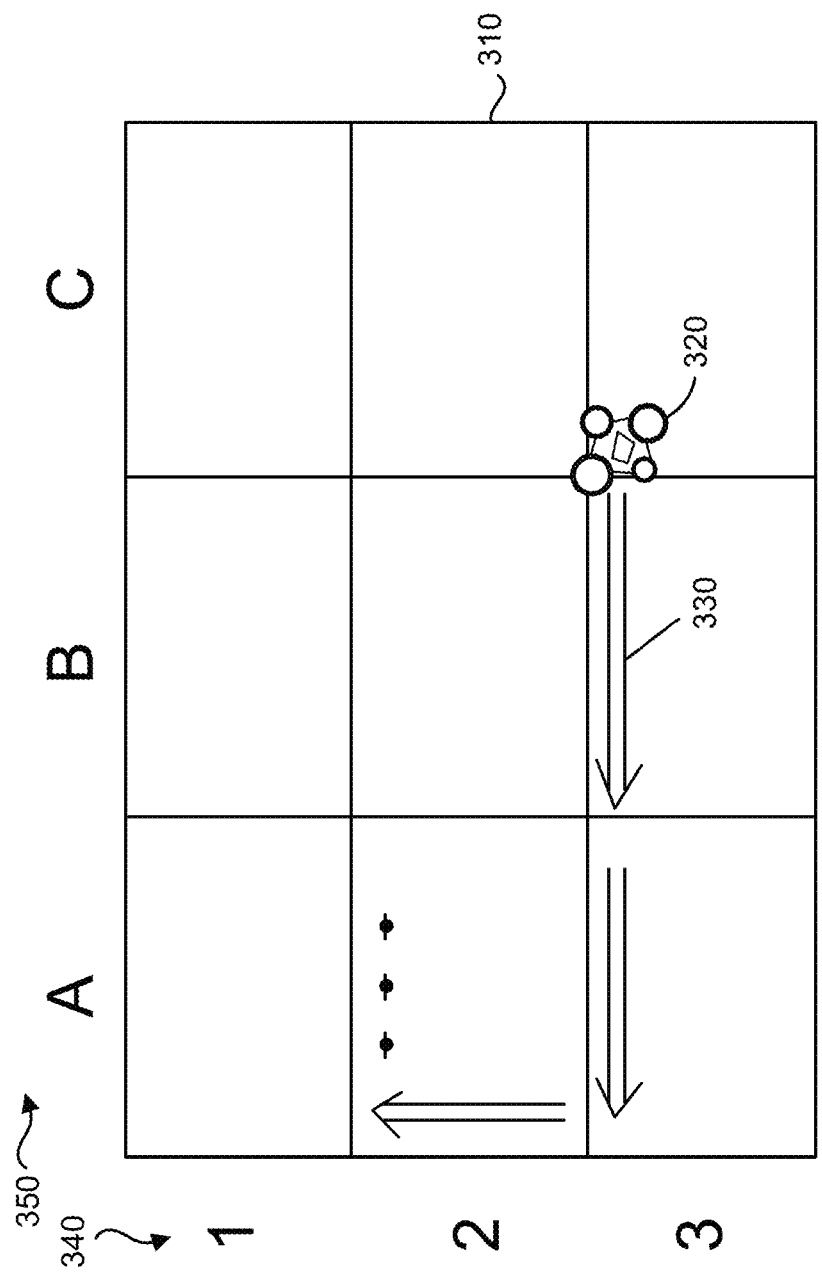
FIG. 3 illustrates an example of a motion path of a physical marker on a display assembly, in accordance with embodiments of the present disclosure.

FIG. 3 illustrates an example of a motion path 330 of a physical marker 320 on a display assembly 310 (e.g., the display assembly 110), in accordance with embodiments of the present disclosure. In particular, the physical marker 320 can be placed, at different times, over the different displays of the display assembly 310 according to the motion path 330. A motion capture system can track the physical marker 320 and the resulting motion capture data can be processed to determine the physical positions and/or physical rotations of the displays. The motion capture system can be the same as the one used in the virtual production system 100, such as being a system available from VICON or OPTITRACK.

The arrangement of the displays in the display assembly 310 can be indexed by rows 350 and columns 340. The motion path 330 is illustrated in FIG. 3 as starting from the right of a bottom row of the display assembly 310 (e.g., the display with index (C,3)), moving horizontally to the left to the end of the bottom row, moving up by one row, moving horizontally to the right, and so on. Of course, other types of motion paths are possible (e.g., an "S" like path starting from the top left, top right, or bottom left or even a zigzag path). On each display, the physical marker 320 is placed at a location that corresponds to the point used to define the physical pose of the object, such as the top left corner of the display (or any other point, such as the center, bottom right corner, etc.). The physical marker 320 remains at the location for a predefined time period (e.g., one second, two seconds, etc.) before being moved to the next location according to the motion path 330. A time of two seconds was found to be acceptable.

The physical marker 320 may be a rigid body that implements motion tracking technology depending on the motion capture system. For instance, in the case of infrared motion capture cameras, the physical marker 320 can include one or more infrared-emitting (active or passive) points (each using a different infrared frequency). Generally, the larger the number of points, the more accurate the position estimation can become. In the example above of placing the physical marker 320 on the top left corner of a display, the top left infrared red emitting point of the marker can be placed over this location of the display and can be used as the reference point (e.g., root of the rigid body) in the motion capture data for determining the physical position and/or physical rotation of the display. The motion capture system can be the same motion capture system used during a virtual production that involves the display assembly 310.

In an example, the physical marker 320 includes a single point detectable by an infrared motion capture camera. In this case, at least three infrared motion capture cameras may be needed to detect the position of the physical marker 320. In particular, each of the three cameras would generate a two-dimensional image that shows the marker position in two dimensions. Because the position, orientation, and field of view of each camera are known, a three-dimensional vector where the physical marker 320 is located can be determined from the three sets of two-dimensional positions. In another example, the physical marker 320 includes multiple points detected by an infrared motion capture camera. In this case, one infrared motion capture camera may suffice to detect the position of the physical marker 320. In particular, the relative positions of the points are known a priori, and this knowledge is used in the processing of the image generated by the camera. Of course, technologies other than infrared can be used. For instance, a two-dimensional visual marker that encodes its dimensions can be used, where an optical sensor operating in the human visible wavelength range can generate images. The poses of the visual marker can be determined by decoding the dimensions and applying geometric reconstruction to the images.

At some point in time (e.g., prior to the start of production, during the virtual production, etc.), the physical marker 320 can be moved by an operator (e.g., a human or a machine, such as a robot, an unmanned vehicle, etc.) according to the motion path 330. For instance, the operator initially places the physical marker 320 (e.g., its top left infrared emitting point) on the top left corner of the (C,3) display for two seconds, then relocates the physical marker 320 (e.g., by aligning its top left infrared emitting point) to the top left corner of the (B,3) display for two seconds, and so on.

The motion capture data can be processed according to the motion path 330 to determine the physical poses of the displays. An example of the processing is further described herein next.

Figure 4:
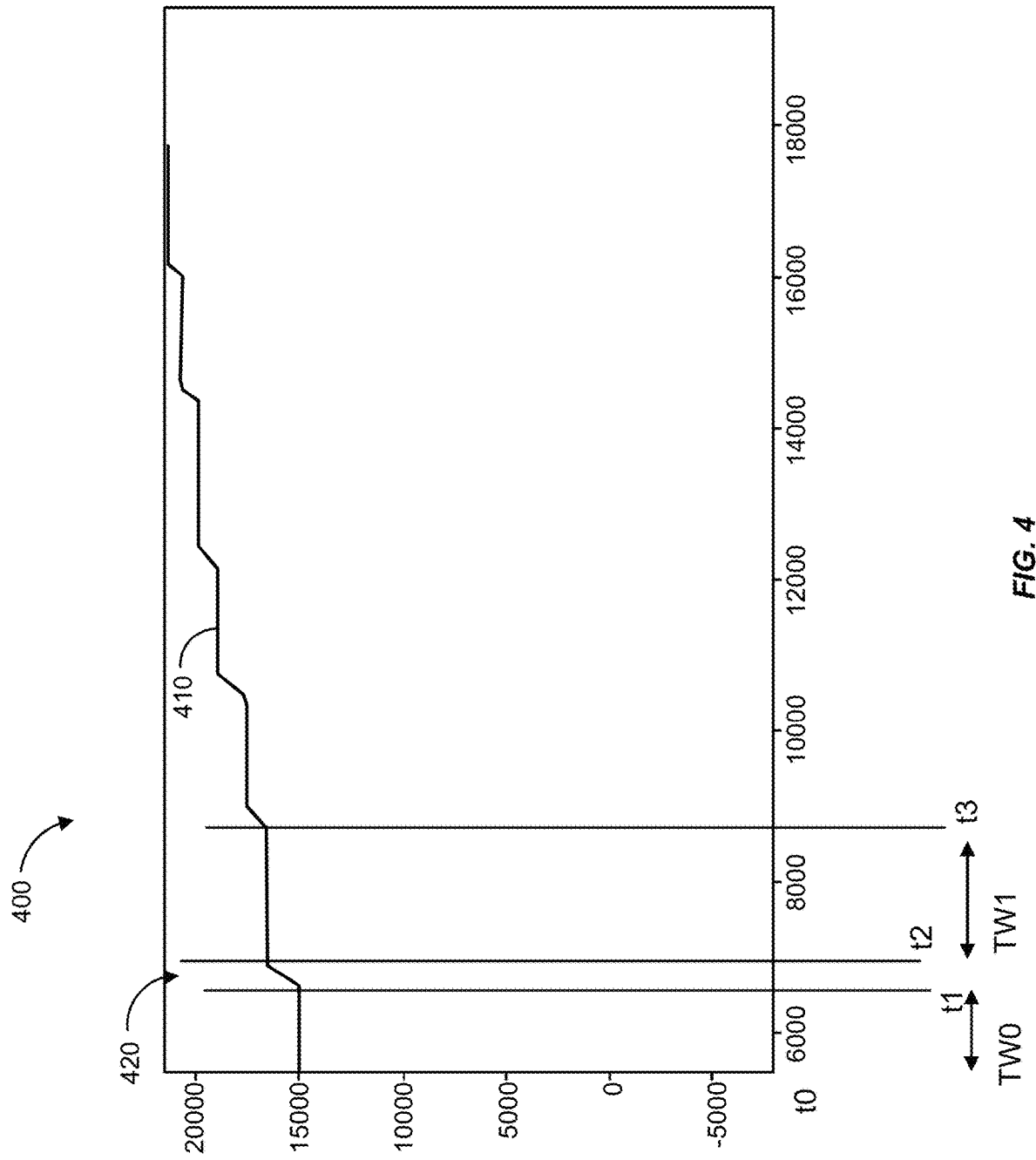
FIG. 4 illustrates an example of measured motion capture data usable to determine physical poses of displays in a display assembly, in accordance with embodiments of the present disclosure.

FIG. 4 illustrates an example of measured motion capture data 410 usable to determine physical poses of displays in a display assembly (e.g., the display assembly 310), in accordance with embodiments of the present disclosure. In particular, a plot 400 is illustrated showing the x coordinates (vertical axis) of a physical marker (e.g., the physical marker 320) over time (horizontal axis). In other words, the motion capture data 410 shown in FIG. 4 corresponds to the motion of the physical marker along the X axis. This motion capture data 410 can be used to determine the pose of each display along the X axis.

Motion capture data of the physical marker can be captured along other axes (e.g., the Y and Z axes). In the interest of clarity of explanation, the x coordinates are described herein. However, the embodiments equivalently apply to the other coordinates of the physical marker to determine the position and rotation of the physical marker in a three-dimensional space (including the X, Y, and Z coordinates and rotation). The embodiments also equivalently apply to non-cartesian coordinate systems (e.g., if a polar coordinate system was used instead, ray and angle coordinates can be tracked and processed to determine the pose in the three-dimensional space).

In an example, the motion capture data 410 is generated at a particular frame rate (e.g., 144 frames per second (FPS)) such that a single x coordinate is available at the particular frame rate (e.g., about once every 7 milliseconds (ms)). Further, the predefined motion path can indicate a timing of statically positioning the physical marker at a location over a display (e.g., about every 2 seconds), this timing can relate to an index of the display (e.g., referring back to FIG. 3, between about 0 and 2 seconds, the index is (C,3), between about 2 seconds and 4 seconds, the index is (B,3) and so on). The processing of the motion capture data 410 can be based on the frame rate and the predefined motion path to determine the physical positions of the displays.

In particular, a second x coordinate is subsequent to a first x coordinate (or two sets of subsequent x coordinates can be used for value comparison and the determination of a change in the x position). The value of the second x coordinate can be compared to the value of the first x coordinate. If the difference between the two values is smaller than a predefined threshold value, this small difference indicates that the x position has substantially remained the same. If the difference between the two values is larger than the predefined threshold value, this large difference indicates that the x position has changed. Different types of comparison are available, such as comparing magnitudes, comparing change in slope, and the like.

This type of comparison-based determination is illustrated in FIG. 4 using a numeral 420. In particular, between time "t1" and time "t2," a change 420 is determined, where the change 420 is larger than the predefined threshold value. Thus, between times "t1" and "t2," the physical marker was relocated from a first location to a second location. The time window "TW0" between times "t0" and "t1" corresponds to the first location. This time window "TW0" has a time length of "t1-t0" and this time length can typically be about 2 seconds. Between times "t1" and "t2," the relocation of the physical marker occurs as indicated by the change 420. The next time window "TW1" starts at about "t2" where the change 420 is no longer observed, corresponds to the second location, and should be about 2 seconds long. The 2 second time window is provided herein for illustrative purposes. A different length of time can be used (e.g., about 1 second, about 5 seconds, etc.), and/or the different time windows need not have about the same time length (e.g., one time window can be about 2 seconds, whereas another time window can be about 5 seconds).

Given the motion path, the first time window "TW0" corresponds to the first display index (C,3). Similarly, the second time window "TW1" corresponds to the second display index (B,3). Next, to determine the x position of the physical marker during the first time window "T0" and, equivalently, the x position of the display having the first display index (C,3), a portion of the motion capture data 410 (referred to herein as "first motion capture data" for clarity) having timing between times "t0" and "t1" is processed. For instance, all the first motion capture data, starting at time "t0" and ending at time "t1," a certain percentage (e.g., 60%) of the first motion capture data, or a subset thereof starting after time "t0" and ending before time "t1" (e.g., 25 ms after time "t0" and 30 ms before time "t1") is statistically analyzed to determine a statistical value (e.g., an average) of the x position. Similar processing can be applied to second motion capture data that corresponds to the second time window "TW2," and so on. Similar processing can also apply to determine the x and z positions and the x, y, and z rotations.

Figure 5:
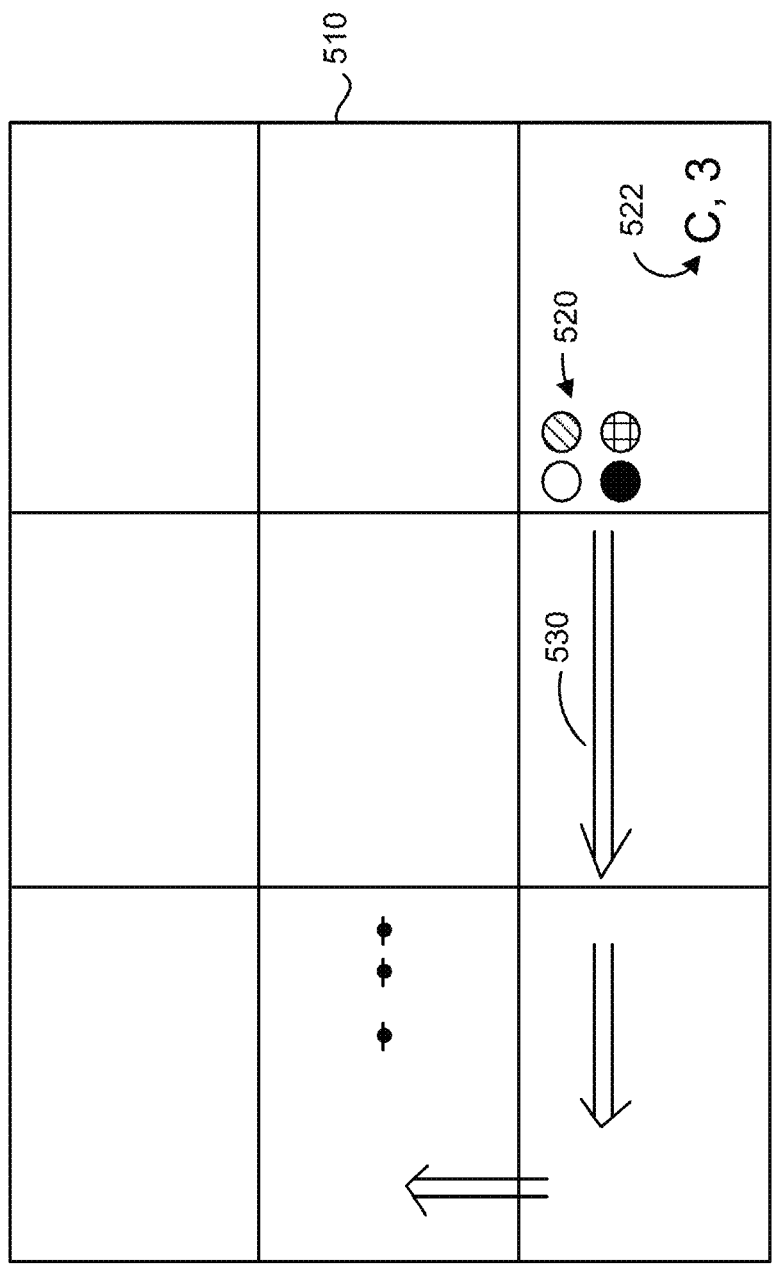
FIG. 5 illustrates an example of a presentation path of a virtual marker on a display assembly, in accordance with embodiments of the present disclosure.

FIG. 5 illustrates an example of a presentation path 530 of a virtual marker 520 on a display assembly 510 (e.g., the display assembly 110), in accordance with embodiments of the present disclosure. Unlike the use of a physical marker 320, here the virtual marker 520 is used to determine the physical poses of the displays included in the display assembly 510. The presentation path 530 can be similar to the motion path 330, whereby the virtual marker 520 is presented on the different displays according to a predefined sequence (e.g., an "S" like sequence starting at the right of the bottom row, a zigzag sequence starting at the left of the top row, etc.). Optionally, a display index 522 of each display is also presented on the display in parallel with the presentation of the virtual marker 520 on the display. In this way, the presentation path 530 need not be predefined and can be random, as long as the virtual marker 520 is presented on the different displays over time.

In an example, the virtual marker 520 can be a multi-dimensional model (e.g., two-dimensional model, three-dimensional model, etc.) of a rigid body. It can be presented at a specific location of a display (e.g., the center as shown in the figure, although other locations are possible, such as the top left corner). Rather than being physically moved between locations as in the case of the physical marker 320, the presentation of the virtual marker 520 can subsist on a display for a time window (e.g., two seconds) at a specific location, to then stop on the display and simultaneously or shortly thereafter start at a next display (which can, but need not be, an adjacent display). The presentation of the display indices can be in parallel and, thus, also follow the presentation path 530. A display index 522 is generally displayed at a display location other than that of the virtual marker 520 (e.g., at the bottom right corner, whereas the virtual marker 520 is presented at the center).

Generally, the virtual marker 520 does not use infrared technology, unless each display is capable of emitting light in the infrared range. Instead, the virtual marker 520 can include one or more virtual points that emit light in the visible human wavelength range and a camera operating in that wavelength range can be used to capture one or more images of the virtual marker 520 upon being presented. The camera may, but need not be, a motion capture camera. Similar to the physical marker 320, the virtual marker 520 can include at least three points, each colored differently and/or shaped differently or even possibly unique to a specific display (e.g., bar code, QR codes, unique shape, etc.), such that a single camera can suffice to generate an image of the virtual marker 520, and this image can be processed to determine the corresponding presentation pose on a display. Alternatively, the virtual marker 520 can include a single point and three or more cameras can be used to generate images of the virtual marker 520, and those images can be processed to determine the corresponding presentation pose on a display. Alternatively, the virtual marker 520 can be a virtual visual marker that encodes its dimensions, and a single camera can suffice to generate images of this visual marker, and the images can be processed to determine the corresponding presentation pose on a display. Alternatively, the virtual marker 520 can have a non-symmetric shape (e.g., being a rectangular prism but not a square cuboid). Its presentation on a display can change its orientation (e.g., rotate, angle, etc.) and at least one image showing its changes can be captured and processed, along with the other images showing the other changes, to determine the presentation pose of the virtual marker 520 on the display. Regardless of the used technique, the presentation pose of the virtual marker 520 on a display corresponds to the physical pose of the display.

Alternatively, rather than relocating the presentation of the virtual marker 520 between the displays, different virtual markers 520 can be presented simultaneously or non-simultaneously on the displays. The virtual markers can have different shapes, where each shape can be associated with a display index. As such, the processing of the images can include recognizing the shapes to then associate each of the virtual marker with a corresponding display. In another example, the virtual markers can have the same shape and, upon the presentation of a virtual marker on a display, the display index is also presented on the display. In this way, the processing of the images can include recognizing the display indices too. In an illustrative use case, the virtual markers (different shapes, or same shape with display indices) are presented simultaneously on the display assembly. One or more images are generated and processed to determine the pose of each of the virtual markers presented on a display and associate this pose with a physical pose of the display.

Once the images of the virtual marker 520 are generated, the images can be processed to determine its presentation pose on each of the displays and, thus, to equivalently determine the physical pose of each display. Different processing techniques are possible. In one example, when the display indices are not presented and a predefined presentation path is used instead, the processing described in connection with FIG. 4 can be applied. In particular, motion capture data is derived from the images by determining the presentation pose in each image, and this data is processed to determine changes over time, and to correlate a no-change time window with a particular display index giving the timing indicated by the predefined presentation path. In another example, the display indices are presented. Upon the processing of an image to detect the presentation pose of the virtual marker 520 therein, the display index shown in the image can be detected too (e.g., by using optical character recognition and/or an object detection machine learning model). Thus, the presentation pose can be associated with the display index and, accordingly, can represent the physical pose of the corresponding display.

A combination of techniques using a physical marker and a virtual marker to collect motion capture data (or, more generally, image data) is possible. In one example, a virtual marker is presented on a display as a placement instruction. An operator can then place a physical marker at the presented location, thereby covering the virtual marker. In another example, a virtual marker may or may not be presented. However, a display index is presented on a display. In this way, in addition to generating motion capture data corresponding to a physical marker placed at a location over the display, image data can be generated in parallel to capture the display index. The motion capture data can be processed to determine the physical pose of the physical marker, and the image data can be processed to detect the display index. Given that a match between the timing of the motion capture data and the timing of the image data, the physical pose is associated with the display index.

Figure 6:
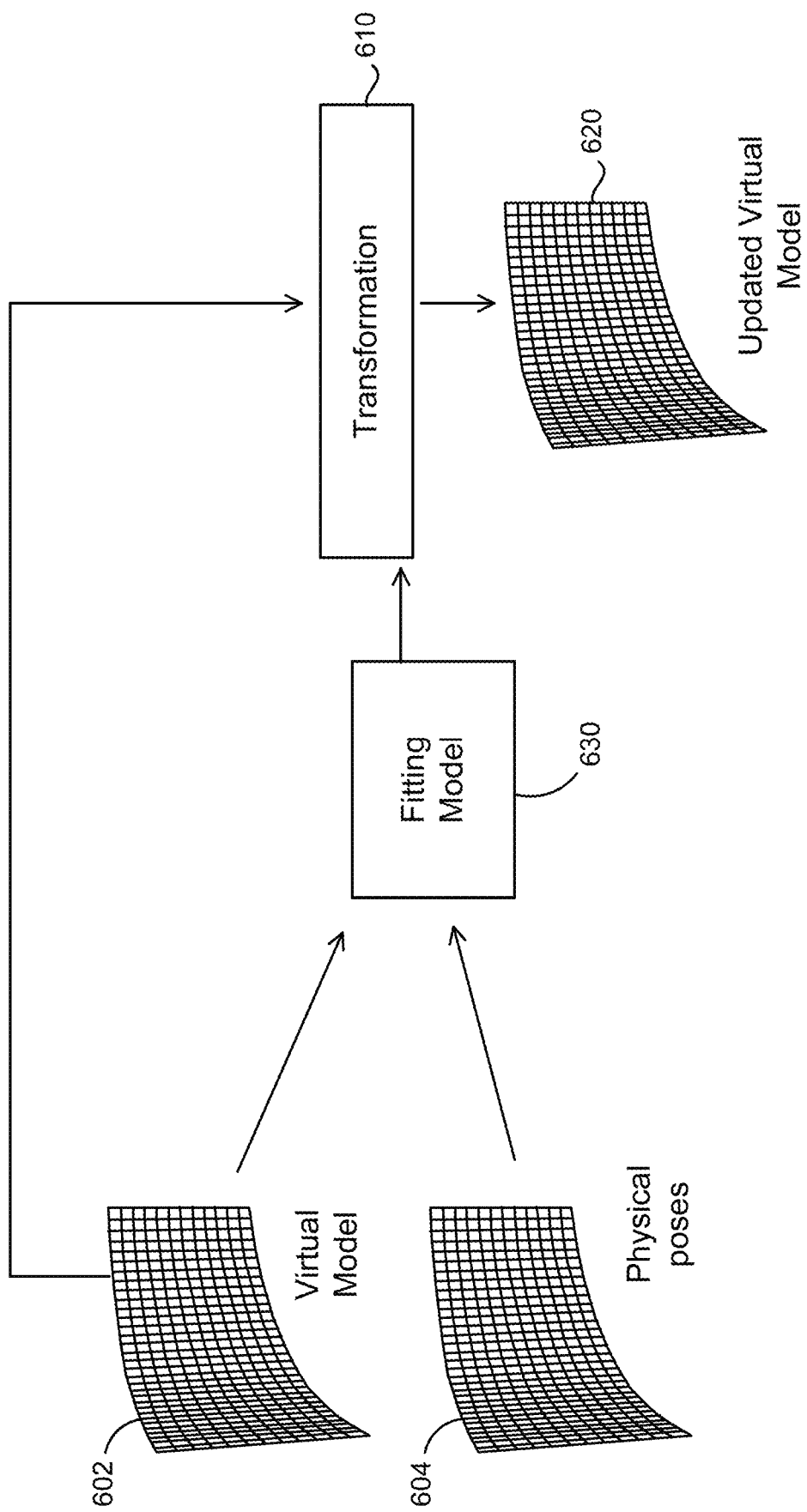
FIG. 6 illustrates an example of determining a transformation and an updated virtual model of a display assembly, in accordance with embodiments of the present disclosure.

FIG. 6 illustrates an example of determining a transformation 610 and an updated virtual model 620 of a display assembly (the display assembly 110), in accordance with embodiments of the present disclosure. In an example, a virtual model 602 (e.g., the virtual model 230) represents the display assembly. The transformation 610 includes a set of functions (e.g., rotation and/or translation per point along each dimensional axis, warping, twisting, bending, random, etc.) that can be applied to the virtual model 602, and this application results in the updated virtual model 620. The updated virtual model 620 corrects (e.g., reduces or even eliminates) pose errors between the virtual model 602 and the display assembly (in other words, the pose errors of the updated virtual model 620 are much smaller, if any, than those of virtual model 602). An example of position error corrections is illustrated in the next figure.

To generate the transformation 610, physical poses 604 of the displays included in the display assembly are determined and are input along with the virtual model 602 (or, more specifically, along with the corresponding virtual positions) to a fitting model 630. The output of the fitting model 630 includes parameters (e.g., coefficients) of the transformation 610. The physical poses 604 can be derived based on motion capture data as described in FIGS. 3-4, on image data (that can include motion capture data) as described in FIG. 6, and/or other positioning techniques.

The fitting model 630 can be a data fitting model that iteratively estimates the parameters of the transformation 610 such that the transformed virtual positions best fit the physical positions. Different types of data fitting models are possible, such as those based on implementations of the Levenberg-Marquardt nonlinear least squares algorithm, a chi-square test algorithm, a curve fitting algorithm, a weighted least square fittings algorithm, a polynomial regression algorithm, a Gauss-Newton algorithm, shift-cutting algorithm, a gradient algorithm, a Nelder-Mead (simplex) search algorithm, or other types of fitting algorithms. Additionally, or alternatively, a machine learning model, such as a regression model or a convolutional neural network can be trained using multiple known virtual models and corresponding display assemblies to output transformation parameters. Once trained, the virtual model 602 and the physical poses 604 can be input to the machine learning model that outputs the parameters of the transformation 610.

As further described in the next figure, the pose error may not be constant and can change depending on a sub-area of the display assembly (e.g., the pose error of a display at the bottom left corner of the display assembly can be much different than that of a display at the center of the display assembly and, similarly, than that of a display at the top right of the display assembly). To optimize for the pose error variation, a localized determination technique is used, rather than a global determination technique. The global determination technique involves inputting the entire set of virtual poses of the virtual model 602 and the entire set of physical poses 604 to the fitting model 630. As such, a single transformation is generated and used to correct pose errors for content rendering across the entire display assembly.

In comparison, the localized determination technique involves dividing the display assembly into sub-areas. Each sub-area contains a subset of the displays. A transformation is generated per subset and is used to correct pose errors for rendering a portion of the content, where this portion is to be presented on the subset of the displays. A first transformation associated with a first display subset can be different than that of a second display subset. Generating the first transformation can include pose data (e.g., virtual positions and physical positions) of the first display subset and exclude pose data of the second display subset. In particular, to generate the first transformation, a subset of the virtual poses and a corresponding subset of the physical poses 604 are input to the fitting model 630. The two subsets are associated with the first display subset. Another subset of the virtual poses and another subset of the physical poses 604 can be input to the fitting model 630 to generate another transformation, and so on. As described herein above, a subset can be defined, for instance, in the X-Y plane by including "x" by "y" displays, where "x" is smaller than the total number of displays along the horizontal axis ("$x_{total}$") and/or "y" is smaller than the total number of displays along the vertical axis ("$y_{tot}$"). The subset can be selected based on a number of factors. For instance, the subset corresponds to the displays that are within a camera field of view. In another illustration, content is to be rendered in a particular way (e.g., with a special effect) on a subset of the displays, where the accuracy of the content's presentation (e.g., including how well the special effect is visually perceivable) depends on the position errors of these displays. In this case, the subset is the one used in the localized determination technique. In yet another illustration, a coarse estimation of the transformation can be used to, for instance, reduce the computational overhead or processing latency. In this illustration, every other display or some other selection pattern (e.g., a random selection distributed across the display assembly) can be used to define the subset. In a further illustration, a multi-granular approach can be used, starting with a coarse, quick computation of the transformation and followed by a more targeted computation (e.g., the selection of displays within a field of view and/or for a particular special effect presentation).

In the context of a virtual production, the different transformations (e.g., each associated with a sub-area of the display assembly, such as by being generated for correcting pose errors localized to the sub-area) can be generated offline and used, as needed, during the virtual production. Alternatively, each transformation is generated in real-time based on a need basis. In particular, during the virtual production, an environmental factor can cause pose changes to certain displays and the transformation(s) can be computed in-real time to rectify the resulting pose errors. The environmental factor can include, for instance, an increase to the temperature in or around the volume or equipment/personnel accidentally bumping into the display assembly. In an illustration, the virtual production involves a camera device (e.g., the camera device 120), whereby content presented on the display assembly and/or its presentation are controlled, at least in part, based on a pose of the camera device. This pose (which can be tracked with the motion capture system) can indicate that the camera is at a distance away from the display assembly and is oriented in a particular direction, whereby the resulting field of view of the camera includes a sub-area of the display assembly. In this situation, the subset of displays that are contained in the sub-area can be determined. For instance, the sub-area is defined as the projection of the field of view on the display assembly, where the projection is determined based on the camera device's orientation and distance to the display assembly. Given the display indices, the displays that belong to the projection are identified, and the corresponding virtual poses and physical poses are retrieved and input to the fitting model 630 to generate in-real time the transformation to use for the rendering of the content.

Figure 7:
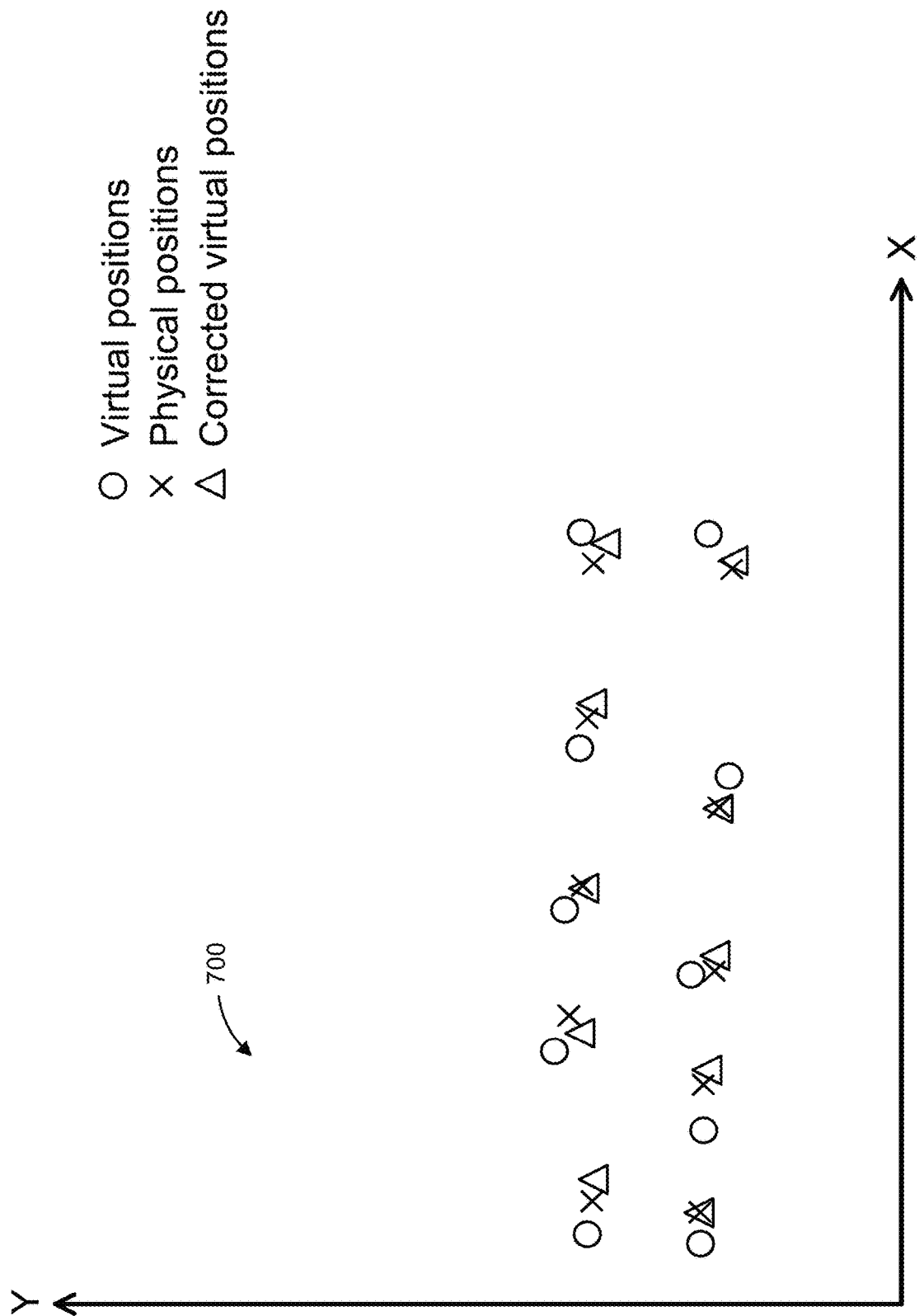
FIG. 7 illustrates an example of position error corrections based on a transformation, in accordance with embodiments of the present disclosure.

FIG. 7 illustrates an example of position error corrections based on a transformation, in accordance with embodiments of the present disclosure. The transformation can be generated using any of the techniques described in connection with FIG. 6. In particular, FIG. 7 illustrates a plot 700, where the horizontal axis corresponds to x coordinates, the vertical axis corresponds to y coordinates, and a point in the plot corresponds to a two-dimensional position of a display defined by an (x,y) coordinate in the X-Y plane. Three types of two-dimensional positions ((x,y) coordinates) are shown: circles correspond to virtual positions from a virtual model of a display assembly, cross marks correspond to physical positions of displays of the display assembly, and triangles correspond to corrected virtual positions generated. Each virtual position corresponds to a physical position and a corrected virtual position, where the corrected virtual position is generated by applying the transformation to the virtual position. Each triple of virtual position, physical position, and corrected virtual position corresponds to a single display. The bottom row of triples in the plot 700 corresponds to a first row of displays at a first height (e.g., row "3" in FIG. 3), whereas the top row of triples in the plot 700 corresponds to another row of displays at a second height (e.g., row "2" in FIG. 3). Conversely, each column of triples corresponds to a column of displays at different heights.

If no position errors existed in the first place (e.g., the transformation is a null, transformation is diagonal unity, etc.), each virtual position would match the corresponding physical position (e.g., both positions would have the same (x,y) coordinates). But that is not the case as illustrated in FIG. 7 due to different factors, as explained herein above. The difference between a virtual position and its corresponding physical position is a position error (e.g., in the X-Y plane). As illustrated in FIG. 7, the position errors are reduced and, in some instances eliminated, whereby the corrected virtual positions more closely match (and some of them overlap) the corresponding physical positions. In an example, actual measurements are made for a display assembly that includes BLACK PEARL 2 displays available from ROE CREATIVE DISPLAY. Each of such displays has a 500×500 front, flat panel (height×width). The display assembly forms a 270-degree curved wall that is 16 m wide by 20 m long. Absent the use of the embodiments of the present disclosure, the position errors along the X, Y, and Z axes vary between about 150 to 250 mm, 20 to 50 mm, and 175 to 225 mm, respectively. By implementing embodiments' global determination technique, these position errors can be significantly reduced to about 30 to 60 mm, 5 to 15 mm, and 40 to 56 mm, respectively.

Although not explicitly illustrated in FIG. 7, the position errors may not be uniform across the different displays. As explained herein above, the localized determination technique to generate multiple transformations, each corresponding to a subset of displays, can be used to optimize the correction of the position errors given their non-uniform distribution.

FIGS. 8-11 describe flows related to determining poses and correcting pose errors in the context of content rendering that relies on a virtual model of a display assembly on which the content is to be displayed. Operations of the flows can be performed by a computer system (e.g., at least one processor, at least one computer readable memory, etc.), such as the computer system 140 of FIG. 1. Some or all of the instructions for performing the operations can be implemented as hardware circuitry and/or stored as computer-readable instructions on a non-transitory computer-readable medium of the computer system. As implemented, the instructions represent components that include circuitry or code executable by processor(s) of the computer system. The use of such instructions configures the computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

Figure 8:
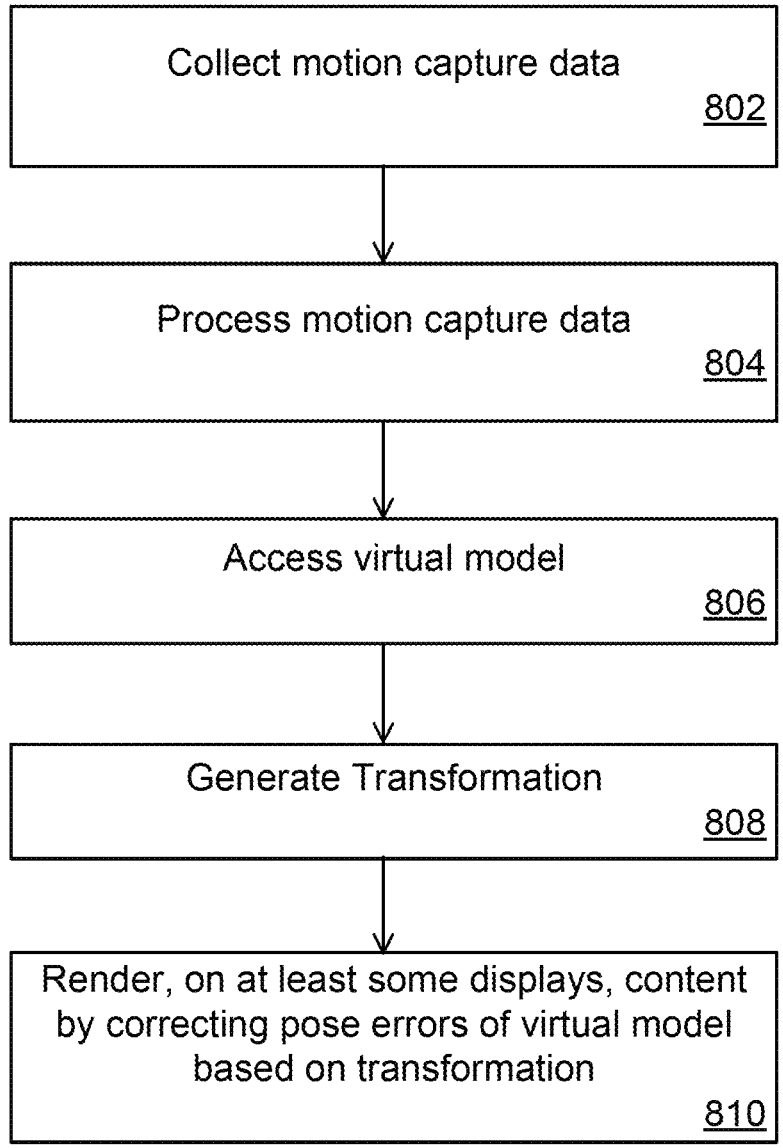
FIG. 8 illustrates an example of a flow for determining and using pose error correction, in accordance with embodiments of the present disclosure.

FIG. 8 illustrates an example of a flow for determining and using position error correction, in accordance with embodiments of the present disclosure. The flow may start at operation 802, where the computer system collects motion capture data. For example, the motion capture data is generated by a motion capture system and sent to the computer system. The motion capture data can track a pose of a physical marker on a display assembly over time, where the pose changes according to a predefined motion path. Additionally, or alternatively, the motion capture data can track a pose of a virtual marker that is presented on the display assembly. As described in connection with FIG. 5, in addition to, or as an alternative to motion capture data, image data can be generated when a virtual marker is used, and the image data can be similarly collected by the computer system.

At operation 804, the computer system processes the motion capture data to determine physical poses of the displays. The processing can depend on the collection technique. In an example of using a physical marker or a virtual marker, the change of the motion capture data overtime is used to determine time windows, and the predefined motion path is used to associate the time windows with display indices. Motion capture data having timing within a time window is used to determine a physical pose (e.g., as a statistical measure, such as an average, applied to this data) of the display having the corresponding display index. In another example of using a virtual marker, image data is processed to determine the pose of a virtual marker, and the timing of the image data is used to determine the corresponding display index according to a presentation path and/or the display index is also presented and recognized from the image directly.

At operation 806, the computer system accesses a virtual model that represents the display assembly. For example, the virtual model is loaded from a memory of the computer system or retrieved from a remote data store.

At operation 808, the computer system generates a transformation. In one example, the virtual poses of the virtual model and the physical poses are input to a fitting model that then outputs parameters of the transformation, where the transformation is associated with the display assembly. In another example, a subset of the virtual poses and a corresponding subset of the physical poses are input to the fitting mode that then outputs the transformation, where the transformation is associated with a sub-area of the display assembly.

At operation 810, the computer system renders content by correcting pose errors of the virtual model based on the transformation. For example, an updated virtual is generated by applying the transformation to the virtual model (or to a portion thereof corresponding to the subset of virtual positions). The updated virtual model is used by a game engine executing on the computer system to render the content, where the rendered content is then displayed by the display assembly.

Figure 9:
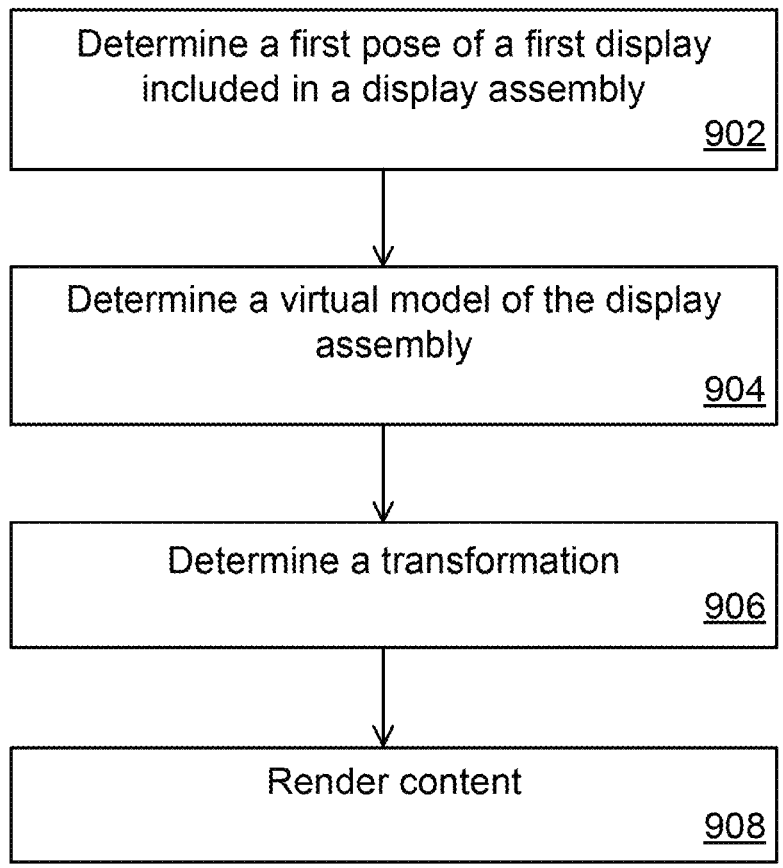
FIG. 9 illustrates an example of a flow for rendering content based on pose error correction, in accordance with embodiments of the present disclosure.

FIG. 9 illustrates an example of a flow for rendering content based on pose error correction, in accordance with embodiments of the present disclosure. Operations of the flow can be implemented as sub-operations of the flow of FIG. 8. In an example, the flow of FIG. 9 may start at operation 902, where the computer system determines a first pose (e.g., a first position and/or a first rotation) of a first display of a plurality of displays included in a display assembly. The display assembly is configured to display content on the plurality of displays. The first pose can be a physical pose of the display and this physical pose can be determined based on the processing of motion capture data and/or image data as described in FIGS. 3-5. The physical pose can be defined by using a point of the display (e.g., the top left corner) relative to an origin of a coordinate system of, for instance, a motion capture system.

At operation 904, the computer system determines a virtual model of the display assembly. The virtual model comprises a virtual representation of each one of the plurality of displays. For instance, the virtual representation of a display includes a multi-dimensional object that represents the display and its arrangement relative to other displays and indicates a virtual pose of the multi-dimensional object. The virtual pose can also be defined by using a point of the multi-dimensional object (e.g., the top left corner) relative to an origin of the coordinate system.

At operation 906, the computer system determines a transformation based on the first pose of the first display and on a first virtual representation of the first display in the virtual mode. For instance, the first virtual pose indicated by the first virtual representation and the first pose are input to a fitting model. The input to this model can include virtual poses and physical poses associated with other displays depending on whether a global determination technique or a localized determination technique is used. The fitting model can then output parameters of the functions (e.g., rotation, translation) that define the transformation.

At operation 908, the computer system renders, on at least some displays of the display assembly, the content based on the transformation and the virtual model. For instance, an updated virtual model is generated from the virtual model translating each, some, or all of the virtual points of the virtual model and/or rotating a virtual object formed by multiple virtual points of the virtual model according to the parameters of the transformation. A game engine can use the virtual model, along with other data, such as the pose of a camera device, to render the content.

Figure 10:
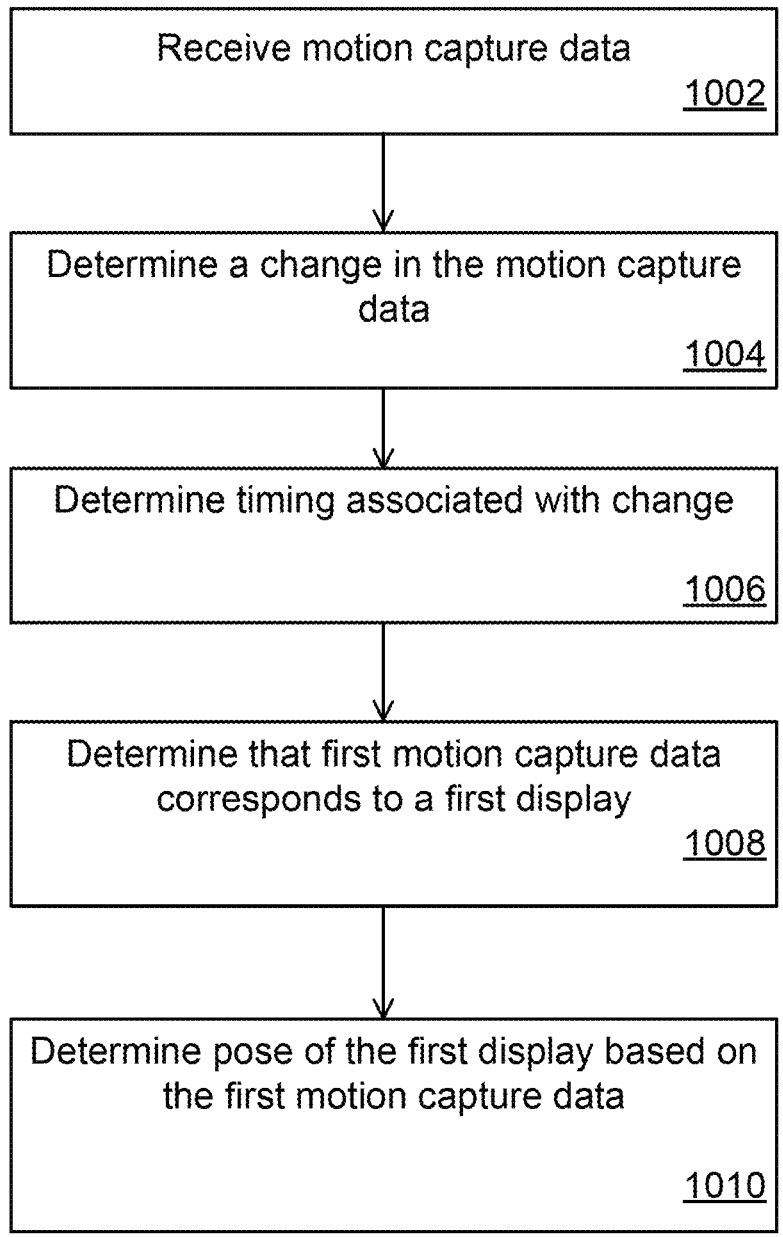
FIG. 10 illustrates an example of a flow for processing motion capture data, in accordance with embodiments of the present disclosure.

FIG. 10 illustrates an example of a flow for processing motion capture data, in accordance with embodiments of the present disclosure. The flow corresponds to a motion capture data processing technique that relies on a predefined motion path that is followed to relocate a physical marker between different positions. Operations of the flow can be implemented as sub-operations of the flow of FIG. 8. In an example, the flow of FIG. 10 may start at operation 1002, where the computer system receives motion capture data. The motion capture data can be generated by a motion capture system at a particular frame rate (e.g., 144 fps).

At operation 1004, the computer system determines a change in the motion capture data. The motion capture data can be multi-dimensional. The change can be determined per dimension. For example, the motion capture data includes x coordinates, where each x coordinate is generated at the particular frame rate (e.g., about every 7 ms). Thus, the values of two x coordinates (or the average values of two ranges of x coordinates) can be compared to determine a difference and this difference is compared to a predefined distance threshold. If larger than the threshold difference, the change is detected, and the computer system determines that it corresponds to the transition of the physical marker from one location over one display to another location over another display.

At operation 1006, the computer system determines timing associated with the change. For example, the timing is available from timestamps of the motion capture data and can be matched with an end or a start of a time window (e.g., a 2 second time window) during which the physical marker is expected to be substantially statically placed at a location over a display.

Each time window can be indicated by the predefined motion path.

At operation 1008, the computer system determines that first motion capture data corresponds to a first display. For example, the changes in the motion capture data are detected. Two consecutive changes correspond to a start and an end of a time window. The timing of the changes is correlated with a display index per the predefined motion path. As such, the portion of the motion capture data between the start and the end is the first motion capture data. And this first motion capture data can be associated with the display index.

At operation 1010, the computer system determines a pose of the first display based on the first motion capture data. For instance, a statistical measure is applied (e.g., averaging) to the first motion capture data to determine the position. In certain situations, a subset of the first motion capture data (e.g., a percentage thereof, or the portion that starts a few milliseconds after the start of the time window and ends a few milliseconds before the end of the time window) can be subjected to the statistical measure to compute the pose.

Figure 11:
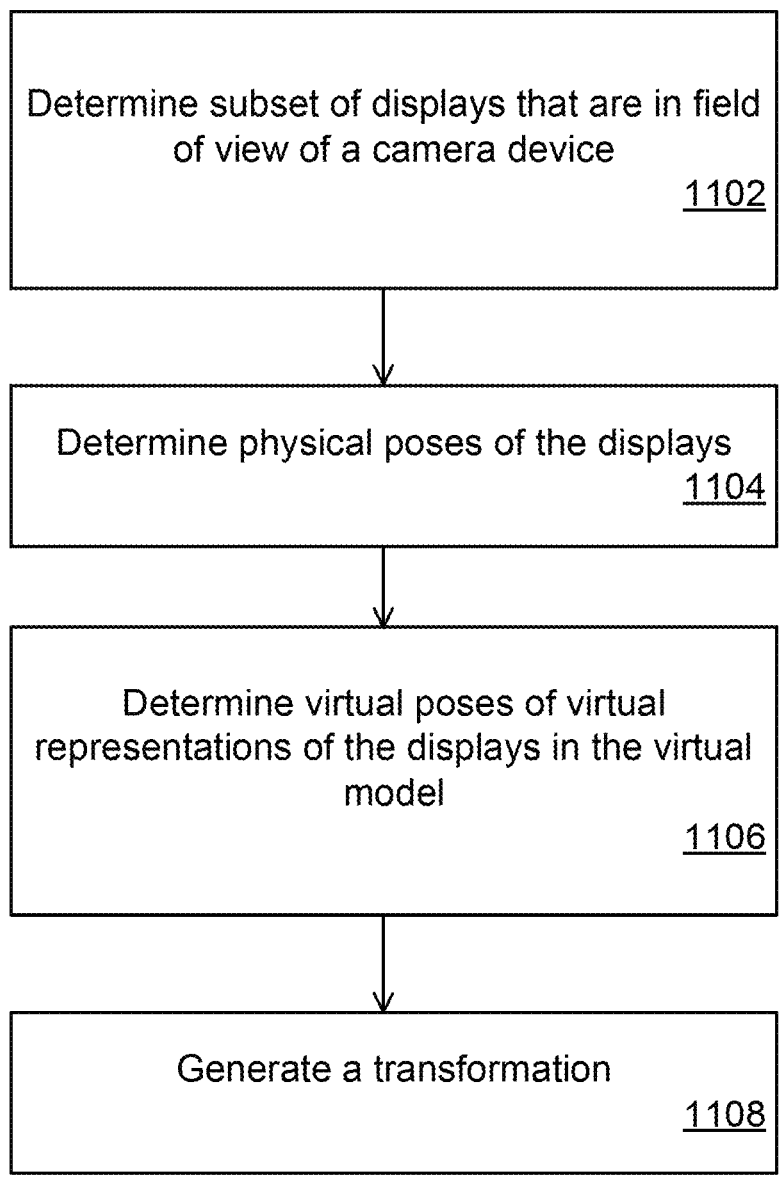
FIG. 11 illustrates an example of a flow for determining a transformation based on a field view of a camera device, in accordance with embodiments of the present disclosure.

FIG. 11 illustrates an example of a flow for determining a transformation based on a field view of a camera device, in accordance with embodiments of the present disclosure. The flow corresponds to a localized determined technique. Operations of the flow can be implemented as sub-operations of the flow of FIG. 8. In an example, the flow of FIG. 11 may start at operation 1102, where the computer system determines a subset of displays that are in the field of view of a camera device. In an example, the content presented on the display assembly and/or the presentation of the content can be changed based on the pose of the camera. The motion capture system can output motion capture data that tracks the camera device, and the computer system can process this data to determine the pose. Given the pose, a projection of the field of view of the camera onto the display assembly can be used to determine the sub-area of the display assembly that is in the field of view. The displays that belong to this sub-area are identified, and their display indices are included in the subset.

At operation 1104, the computer system determines physical poses of the displays, where these displays are in the field of view. The poses can be determined based on motion capture data of a physical tracker and/or a virtual tracker and/or image data of a virtual tracker, as described in FIGS. 3-5. In particular, display indices of these displays are used to look up and retrieve the corresponding physical position data.

At operation 1106, the computer system determines virtual poses of virtual representations of the displays in the virtual model. For example, the virtual representations (e.g, multi-dimensional objects representing the displays) are also indexed with the same display indices. As such, the display indices are used to look up and retrieve the corresponding virtual position data.

At operation 1108, the computer system generates a transformation. For example, the virtual poses and the physical poses are input to a fitting model that then outputs parameters of the transformation.

Figure 12:
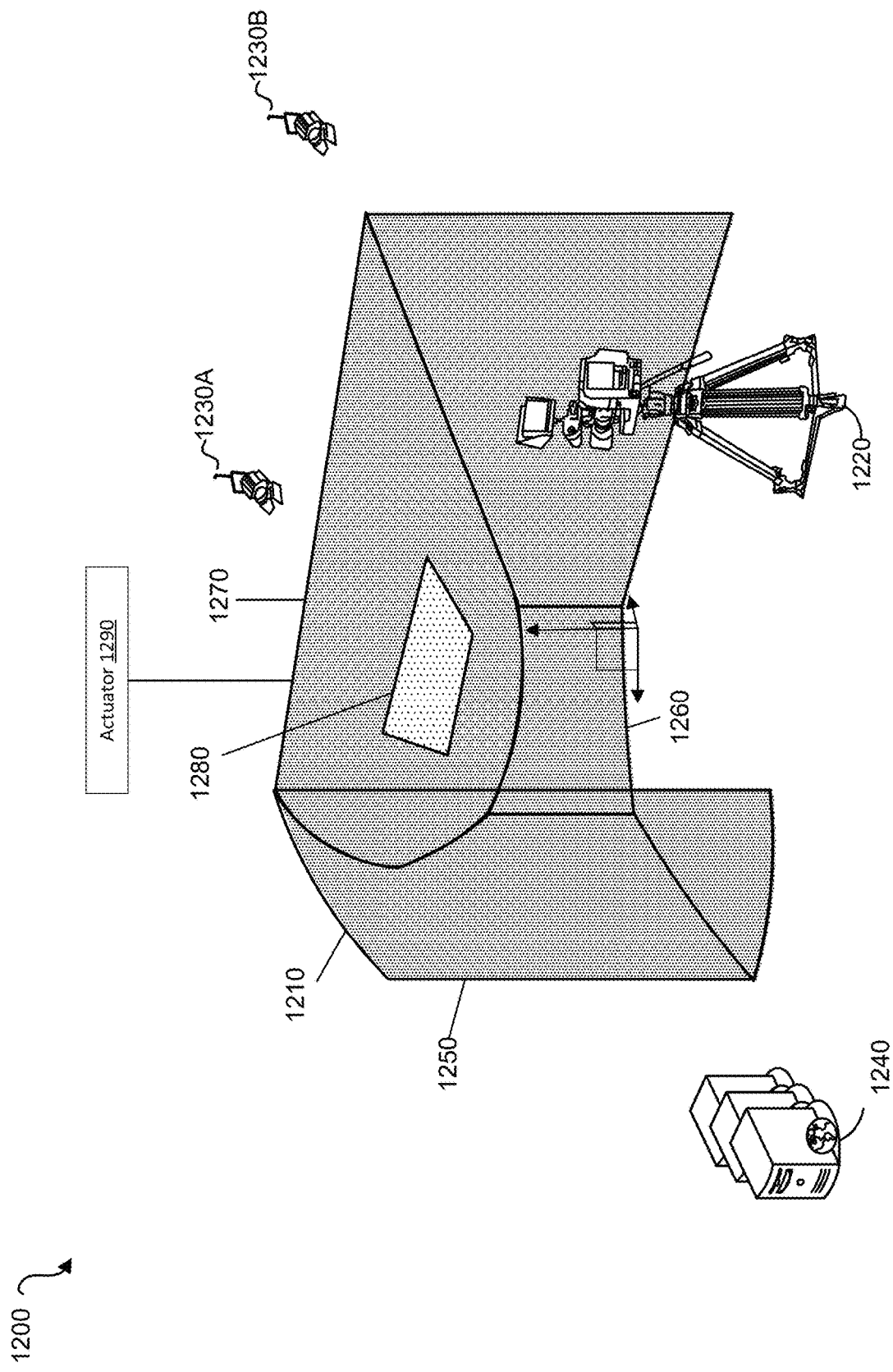
FIG. 12 illustrates an example of a virtual production system, in accordance with embodiments of the present disclosure.

FIG. 12 illustrates an example of a virtual production system 1200, in accordance with embodiments of the present disclosure. As illustrated, the virtual production system 1200 includes a display assembly 1210, a camera device 1220, motion capture devices 1230A and 330B (generally referenced to with the numeral "1230"), and a computer system 1240. The display assembly 1210 can include a peripheral wall 1250, a back wall 1260, and a roof 1270. The display assembly 1210 can be configured as a virtual stage that presents content and that defines a volume where the camera device 1220 is located.

The roof 1270 can include a display 1280 that can be moved from a first physical pose to a second physical pose. As illustrated, the display 380 is arranged in a first physical pose such that the display is flush with a surface of the roof 1270. The display 1208 can be coupled to an actuator that can move the display 1280 from the first physical pose to the second physical pose. The actuator 1290 can include, for example, a winch system, a motor, levers, a pulley system, or a robotic arm. In some instances, the display 1280 can be moved from a first physical pose to a second physical pose, for example, in order to create a desired effect for the display 1280. This can be performed by using the actuator 1290 to move the display 1280. Additionally, or alternatively, one or more other displays that may be located in the roof 1270 and/or any other walls 1250-1260 can be moved, resulting in a pose change. A pose change of any display can be updated in a virtual model (e.g., the virtual model 230).

Figure 13:
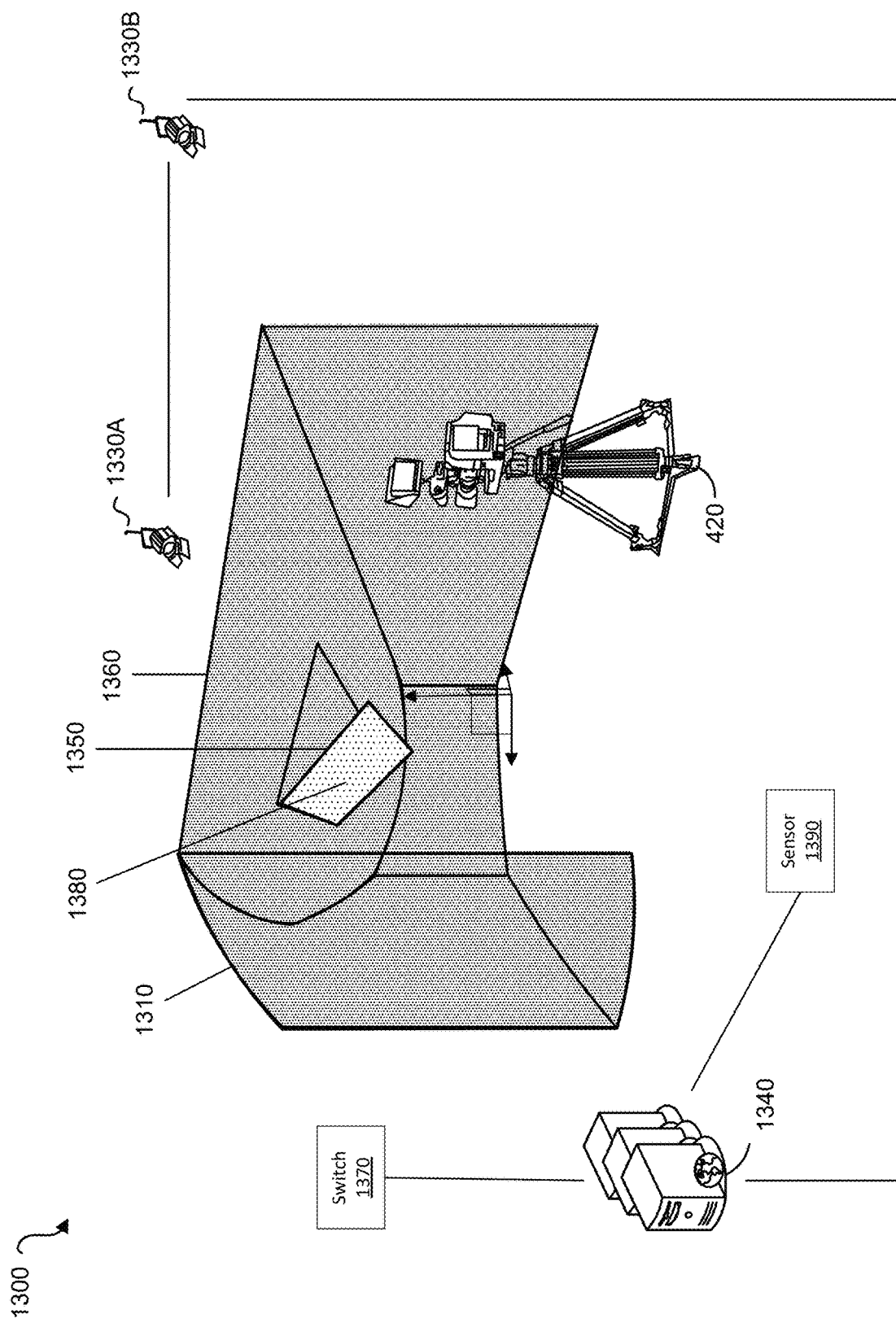
FIG. 13 illustrates an example of a virtual production system, in accordance with embodiments of the present disclosure.

FIG. 13 illustrates an example of a virtual production system 1300, in accordance with embodiments of the present disclosure. As illustrated, the virtual production system 1300 includes a display assembly 1310, a camera device 1320, motion capture devices 1330A and 1330B (generally referenced to with the numeral "1330"), and a computer system 1340.

FIG. 13 can differ from FIG. 12, in that the display 1350 (corresponding to the display 1280) is arranged in a second physical pose. In FIG. 12, the display 1280 is arranged in a first physical pose, such that the display 1280 is flush with a surface of the roof 1270. In FIG. 13, the display 1350 has been moved to a second physical pose, such that the display 1350 is rotated away from the roof 1270. The computer system 1340 can still display content on the display 1350. However, in order to generate the desired visual effect, the virtual model can be updated to include a virtual pose for the display 1350 that represents a current physical pose of the display 1350.

As indicated above, the process for updating the virtual model can be manually initiated or initiated based on a response to sensor measurement. For manual initialization, the computer system 1340 can be in operable communication with a switch 1370. The switch 1370 can include one or more keys on a keyboard, a command prompt, a physical switch external to the computer system 1340, or other appropriate switch 1370. A user can use the switch to initiate a initialize a display pose estimation process. A virtual marker 1380 can be displayed on the display 1350. The virtual marker 1380 can include a pattern, such as a synthetic marker (e.g., CharUCo or ArUco markers). As illustrated, the virtual marker 1380 spans across the entire surface of the display 1350. However, in some instances, the virtual marker 1380 can be displayed on a portion of the display surface. The virtual marker can have a presentation pose that corresponds to a physical pose of the display 1350.

By using the switch 1370, a motion capturing system, including motion capture devices 1330A and 1330B, can begin capturing motion data using the virtual marker. In some instances, the motion capturing devices 1330A and 1330B can be configured with the coordinates of the display 1350 to focus on the display. In other instances, the motion capturing devices 1330A and 1330B can capture the entirety of the display assembly 1310. The motion capturing devices 1330A and 1330B can continuously capture frames of motion data while the display 1350 is moving. The motion capturing devices 1330A and 1330B can further transmit the motion data to the computer system 1340.

The computer system 1340 can use a final frame (e.g., a frame captured after the display 1350 stops moving) to determine the pose data of the display 1350. The pose data can include the physical coordinates of the display 1350. The computer system 1340 can generate inputs based on the pose data and the virtual model to feed into a fitting model. The fitting model can use a transformation function to translate the current physical pose of the display 1350 to the current virtual pose of the display 1350. The computer system 1340 can further update the virtual model to include the current virtual pose of the display 1350. The computer system 1340 can display content on the display assembly 1310 using the updated model.

As an alternative to using the switch 1370 to initiate the pose estimation process, a sensor-based responsive trigger can be used. The virtual production system 1300 can include one or more sensors 1390 configured to collect data (speed, acceleration, six degrees of freedom coordinates) from the display assembly 1310. The sensors 1390 can include, for example, proximity sensors, light sensors, pressure sensors, infrared sensors, ultrasonic sensors, or any other appropriate sensors. The sensors 1390 can be in operable communication with the computer system 1340 and provide collected data to the computer system 1340.

The sensor-based data can be presented as a time series and computer system 1340 can use a change point detection algorithm to detect change points in the sensor data. Change point detection is a process of detecting changes in a property (e.g., physical coordinates of a display) represented by the time series. The computer system 1340 can use the change point detection algorithm (e.g., forgetting factor-based change point detection algorithm, window-based segmentation, binary segmentation, bottom-up segmentation, pruned extract linear time, and exact segmentation dynamic programming) to identify the borders between changes in the time series. A plot of a first detected change point and a second detected change point is provided in FIG. 14.

In some instances, a first detected change point can be representative of the beginning of a movement of the display 1350 and a second detected change point can be representative of the end of the movement of the display 1350. Therefore, a time interval between the first detected change point and the second detected change point can represent the time interval that the display is in motion.

Based on detecting the first change point, a virtual marker can be displayed on the display 1350 that is moving. The computer system 1340 can further initialize the motion capturing devices 1330A and 1330B. Initializing the motion capturing devices 1330A and 1330B can include determining a location and an orientation of each motion capturing device and configuring the device for capturing display motion (e.g., configuring the frame rate). The motion capturing devices 1330A and 1330B can capture frames of the display 1350 as it is moving. The motion capturing devices 1330A and 1330B can continue to capture the frames until the computer system 1340 detects the second change point indicating that the display 1350 has stopped moving. The computer system 1340 can further send a signal to the motion capturing devices 1330A and 1330B to stop collecting motion data of the display 1350. In some instances, the motion capturing devices 1330A and 1330B continue to capture one or two frames after the display 1350 has stopped moving.

The computer system 1340 can use the collected sensor data to determine the physical pose (e.g., physical coordinates) of the display 1350 after it has stopped moving. The computer system 1340 can analyze the characteristics of the virtual marker to determine a presentation pose of the marker (e.g., coordinates of the virtual marker that correspond to physical coordinates of the display). The characteristics can include, for example, chessboard corners, centers of circles, and other image features. The computer system can further use an algorithm to determine a physical pose of the display 1350. For example, the computer system 1340 can use a perspective-n-point (PnP) pose computation algorithm to evaluate a physical pose of the display in a desired coordinate system (e.g., a coordinate system of the camera of a motion capturing system). The computer system can further generate inputs based on the virtual model (e.g., virtual model generated prior to the display 1350 moving) and the physical pose for a fitting model. The fitting model can output an updated virtual model that includes an updated virtual pose of the display 1350 representative of the display's physical pose after it has stopped moving.

It should be appreciated that in some embodiments, rather than waiting for the display 1350 to stop moving, the computer system 1340 can begin determining a physical pose of the display 1350 as it is moving. For example, in response to detecting the first change point, a virtual marker can be displayed on the display 1350, and the computer system can initialize the motion capturing devices 1330A and 1330B to begin capturing motion data using the virtual marker. The computer system 1340 can continuously generate inputs using the virtual model (e.g., virtual model generated prior to the display 1350 moving) and the current physical pose of the display 1350 as it is moving for a fitting model. The fitting model can use the inputs to transform the virtual pose of the display 1350 from before the display moved to a virtual pose of the display 1350 as it is moving. For example, if the frame rate of the motion capturing devices 1330A and 1330B is ten frames per second and the time interval for the display moving is ten seconds, the computer system 1340 can generate one-hundred updated virtual poses for one-hundred iterations of an updated virtual model.

Figure 14:
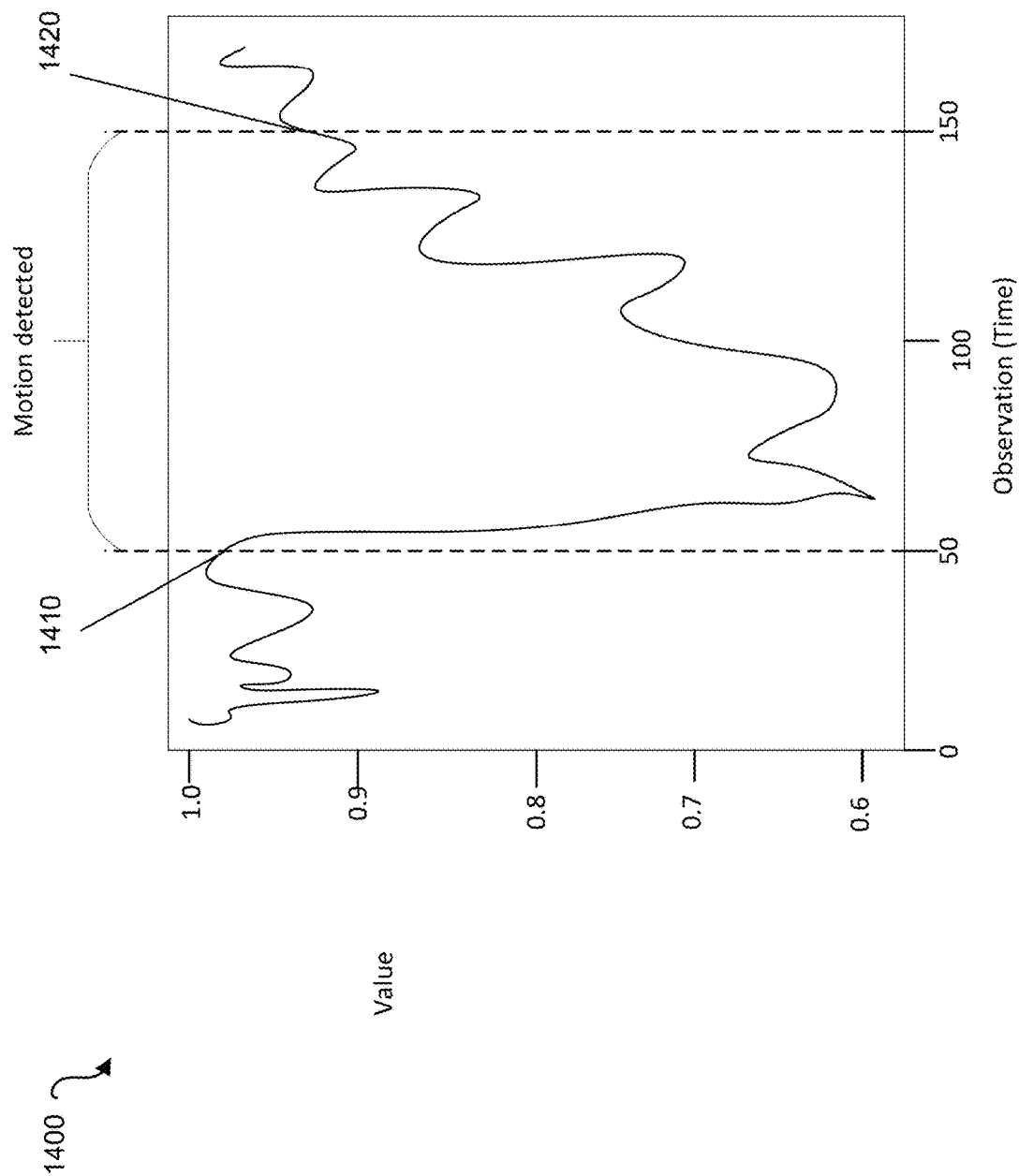
FIG. 14 is a plot of change point data of a virtual production, in accordance with embodiments of the present disclosure.

FIG. 14 is a plot 1400 of change point data of a virtual production, in accordance with embodiments of the present disclosure. The plot 1400 includes time on an x-axis and a value on the y-axis. The value can be based on sensor-based data. It should be appreciated that the collected sensor-based can require pre-processing. For example, the sensor-based data can include outliers, missing values, corrupted values. A computer system can pre-process the data prior to performing analytics on the data. The values on the y-axis can be representative of the sensor-based data after cleaning.

As illustrated, the computer system has used a change point detection algorithm to detect at first change point 1410 at time 50, and a second change point 1420 at time 150. The data from time "0" to time "50" and the data from time "150" and beyond can be representative of a time that a display of a display assembly is not moving. The data from time "50" to time "150" can be representative of a time that the display is moving. A computer system can use a change point detection algorithm to detect the first change point 1410. Based on the detection, a virtual marker can be displayed on the display that is moving. The computer system can further initialize a motion capturing system to capture motion data from the display using the virtual marker. In response to detecting the second change point 1420, the computer system can send a signal to the motion capturing system to stop collecting motion data. The computer system can then determine a physical pose of the display based on the motion data. The computer system can further generate inputs, using a virtual model generated prior to the display motion and the physical pose of the display, for a fitting model. The fitting model can use the inputs to transform the virtual pose of the display to an updated virtual pose that reflects the display's physical pose after the movement.

Figure 15:
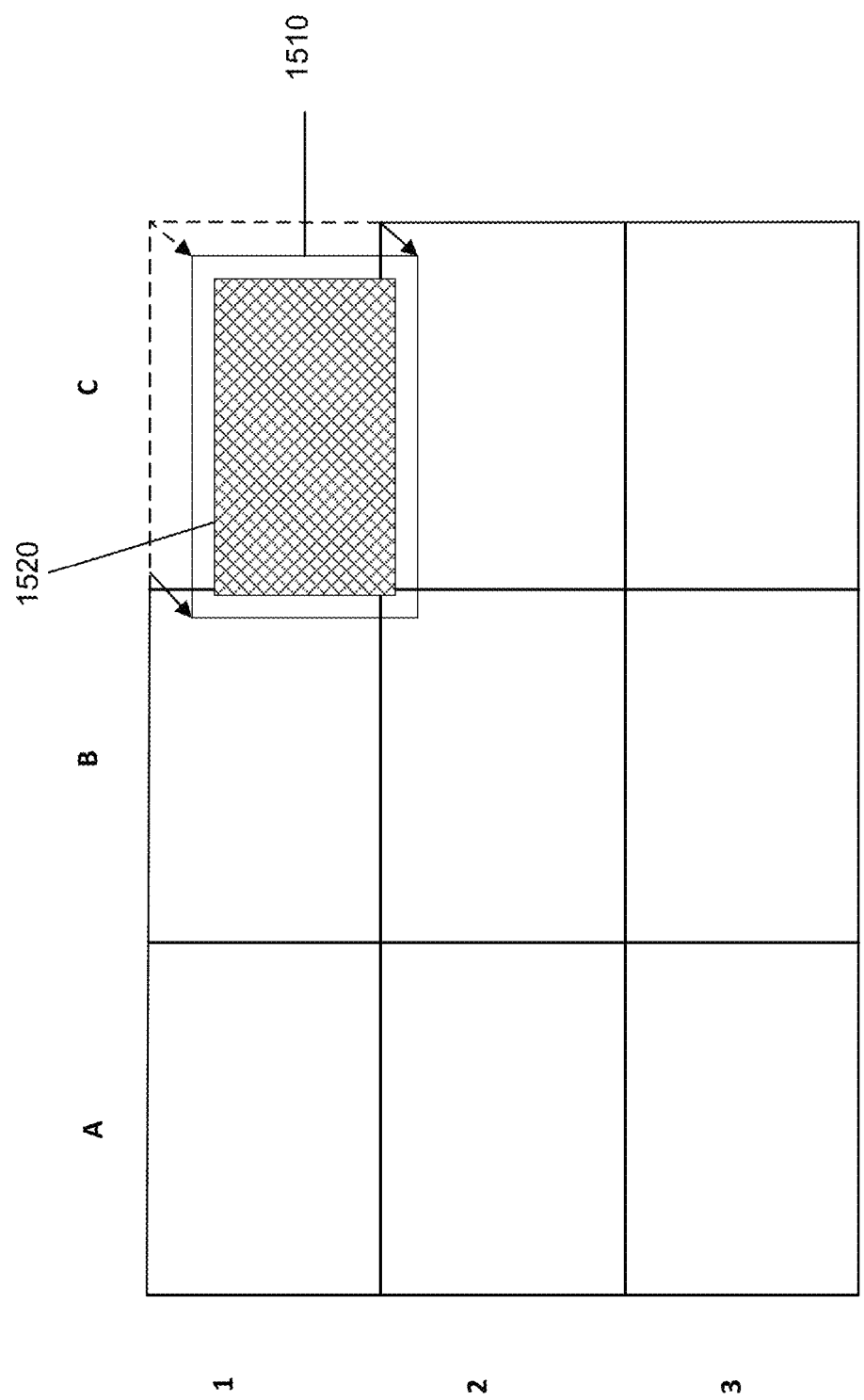
FIG. 15 is an illustration of an example display assembly, in accordance with embodiments of the present disclosure.

FIG. 15 is an illustration of an example display assembly 1500, in accordance with embodiments of the present disclosure. The display assembly 1500 is comprised of multiple displays. As illustrated, the display assembly is comprised of nine displays, which are identified by a grid system for convenience. As illustrated, a display 1510 located at position (A, 1) has been moved from a first physical pose (e.g., a first pose indicated by the dashed lines) to a second physical pose that protrudes away from the surface of each other display of the display assembly 1500. Whereas in the first physical pose, the surface of the display 1510 is flush with the surface of each other display on the display assembly 1500, that is not the case in the second physical pose. For example, an actuator can be used to move the display 1510 to protrude away from the surface of each other display of the display assembly 1500.

A virtual marker 1520 is displayed on a portion of the display 1510 or an entirety of the display. In the instance that the virtual marker 1520 is displayed on a portion of the display, the remaining portion of the display 1510 can display a portion of a scene. For example, the remaining portion of the display 1510 can display the portion of the scene being displayed prior to the display of the virtual marker 1520. This portion can be predefined at a location, for example, a center portion of the display 1510 or any other portion (e.g., a top left corner portion) and to have a predefined size (e.g., a certain number of pixels in width and height). The virtual marker can be displayed based on detecting that the display 1510 is moving. In an example, the virtual marker 1520 can represent a multi-dimensional model (e.g., two-dimensional model, three-dimensional model, etc.) of a rigid body. It can be presented at a specific location of a display according to a specific size (e.g., the center as shown in the figure, although other locations are possible, such as the top left corner). Generally, the virtual marker 1520 does not use infrared technology, unless each display is capable of emitting light in the infrared range. Instead, the virtual marker 1520 can include one or more virtual points that emit light in the visible human wavelength range and a camera operating in that wavelength range can be used to capture one or more images of the virtual marker 1520 upon being presented. The camera may, but need not be, a motion capture camera. The virtual marker 1520 can include at least three points, each colored differently and/or shaped differently or even possibly unique to a specific display (e.g., bar code, QR codes, unique shape, etc.), such that a single camera can suffice to generate an image of the virtual marker 1520, and this image can be processed to determine the corresponding physical pose of a display. Alternatively, the virtual marker 1520 can include a single point and three or more cameras can be used to generate images of the virtual marker 1520, and those images can be processed to determine the corresponding physical pose of a display. Alternatively, the virtual marker 1520 can be a virtual visual marker that encodes its dimensions, and a single camera can suffice to generate images of this visual marker, and the images can be processed to determine the corresponding physical pose of a display.

Alternatively, the virtual marker 1520 can have a non-symmetric shape (e.g., being a rectangular prism but not a square cuboid). Of course, a combination of various techniques is possible. For example, the virtual marker 1520 can include at least three points and multiple cameras can be used to capture images thereof such that the pose determination can have a higher accuracy. In another example, the virtual marker 1520 can be updated and one or more cameras can be used to generate one or more images corresponding to each update. In particular, the virtual marker 1520 can be presented initially as including at least three points and then updated to present a single point that multiple cameras can image.

A motion capturing system can further use the virtual marker 1520 to identify the display 1510 and capture motion data representing a movement of the display 1510. It should be appreciated that although FIG. 15 illustrates the display 1510 moving, other display(s) of the display assembly 1500 can be configured to move. Furthermore, a set of displays can be configured to move. For example, the displays location at positions (B, 1), (B, 2), (C, 1), and (C, 2) can be configured to move. In this instance, a virtual marker can be displayed on one or more than one display. If multiple displays are moved, the virtual markers can be the same or can be different. Using different virtual markers may facilitate the tracking of the position change of each display and enable the use of the same camera system. Nonetheless, it is possible to use the same camera system for the tracking even when the same virtual marker is presented on the different moving displays. In this case, the initial pose of each display is known and the tracking can be relative to the initial pose so that each final pose can be associated with an initial pose which in turn is associated with a display.

Figure 16:
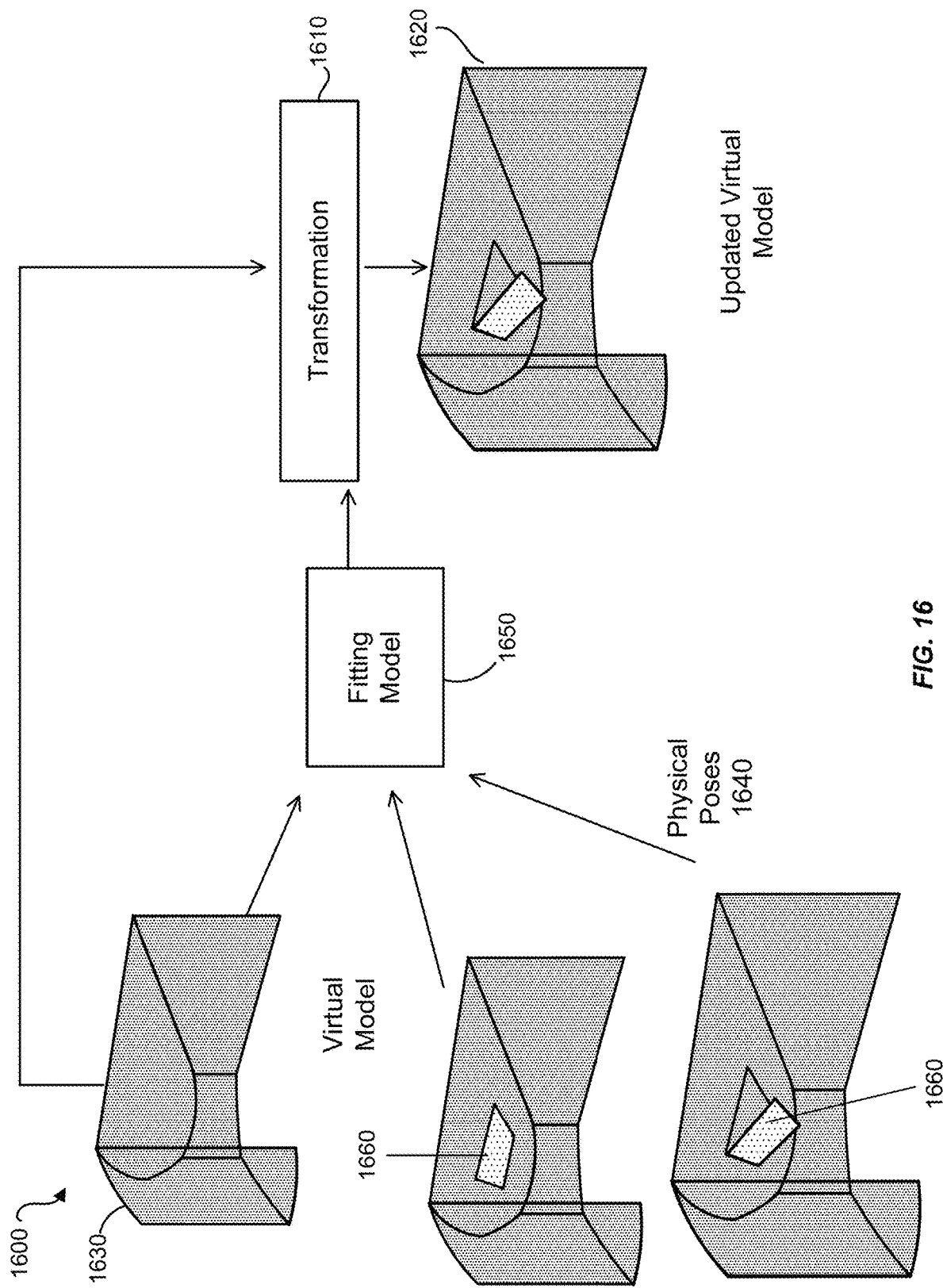
FIG. 16 is an illustration of an example of determining a transformation and an updated virtual model of a display assembly, in accordance with embodiments of the present disclosure.

FIG. 16 is an illustration 1600 of an example of determining a transformation 1610 and an updated virtual model 1620 of a display assembly, in accordance with embodiments of the present disclosure. In an example, a virtual model 1630 represents the display assembly prior to moving a display of the display assembly. The transformation 1610 includes a set of functions (e.g., rotation and/or translation per point along each dimensional axis, warping, twisting, bending, random, etc.) that can be applied to the virtual model 1630, and this application results in the updated virtual model 1620. The updated virtual model 1620 can represent the physical pose of each display of the display assembly.

To generate the transformation 1610, physical poses 1640 of the displays included in the display assembly are determined and are input along with the virtual model 1620 (or, more specifically, along with the corresponding virtual positions) to a fitting model 1650. As illustrated, the physical poses 1640 includes a physical pose of a display 1660 before the display 1660 has been moved and a physical pose of the display 1660 after it has been moved. In some instances, the physical poses only include the physical pose of the display 1660 after it has been moved. The output of the fitting model 1650 includes parameters (e.g., coefficients) of the transformation 1610. The physical poses 1640 can be derived based on motion capture data, on image data (that can include motion capture data), and/or other positioning techniques.

The fitting model 1650 can be a data fitting model that iteratively estimates the parameters of the transformation 1610 such that the transformed virtual positions best fit the physical positions. Different types of data fitting models are possible, such as those based on implementations of the Levenberg-Marquardt nonlinear least squares algorithm, a chi-square test algorithm, a curve fitting algorithm, a weighted least square fittings algorithm, a polynomial regression algorithm, a Gauss-Newton algorithm, shift-cutting algorithm, a gradient algorithm, a Nelder-Mead (simplex) search algorithm, or other types of fitting algorithms. Additionally, or alternatively, a machine learning model, such as a regression model or a convolutional neural network can be trained using multiple known virtual models and corresponding display assemblies to output transformation parameters. Once trained, the virtual model 1630 and the physical poses 1640 can be input to the machine learning model that outputs the parameters of the transformation 1610.

FIG. 17 is a table 1700 representing a difference between measured parameters and calculated parameters. The table 1700 includes a column for test data that includes values obtained through actual measurements and a column for calculated value (CV) data that includes values obtained using the herein described techniques. As seen a test data value for a distance between two poses of a display is 2395.117210 millimeters (mm), whereas the CV of the distance between two poses of the display is 2396.601829 mm. The difference between these two values is 1.484619 mm. Additionally, the test data values for the relative rotation between two poses of a display is −0.482724°, −41.687118°, and 1.1130060°. The calculated values for the relative rotation between two poses of the display are 0.578781°, −41.718646°, and −0.956472°.

Figure 18:
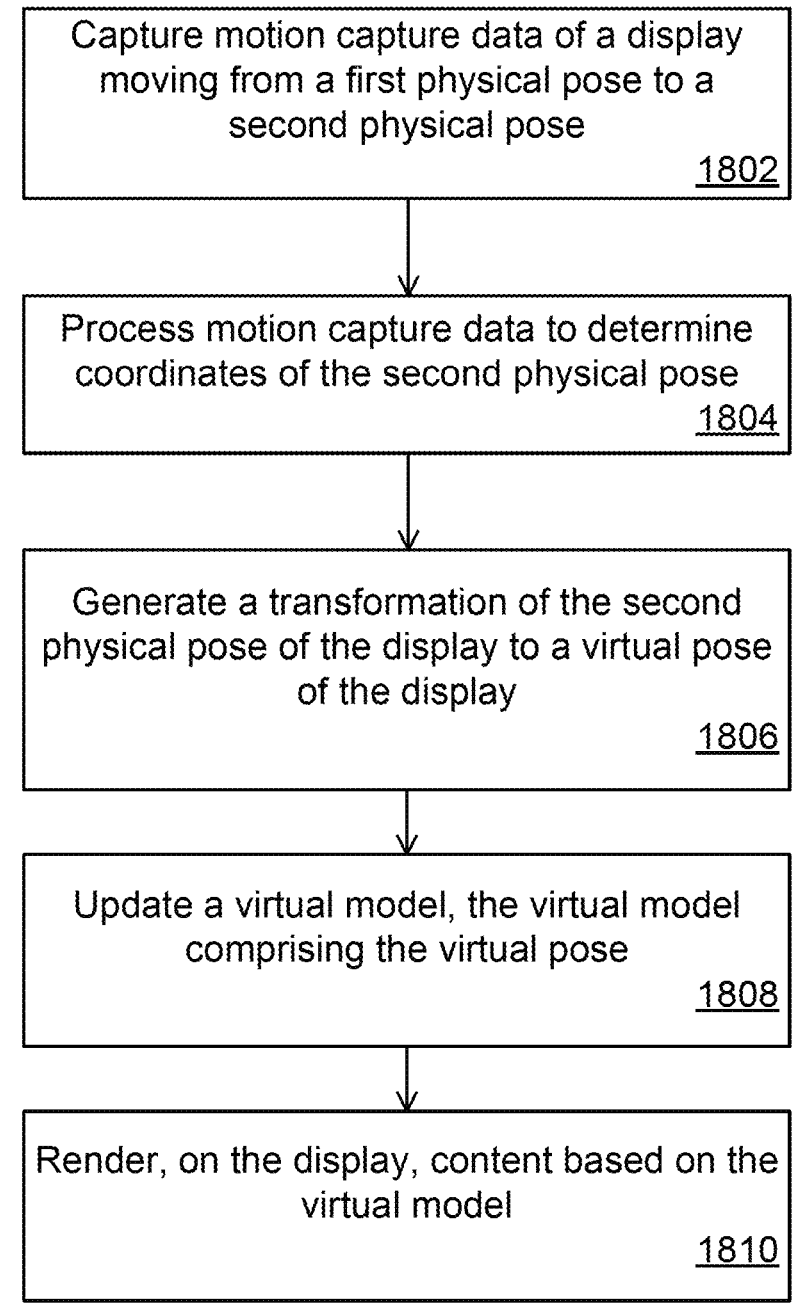
FIG. 18 illustrates an example of a process flow for determining an updated virtual model based on a movement of a display, in accordance with embodiments of the present disclosure.
Figure 19:
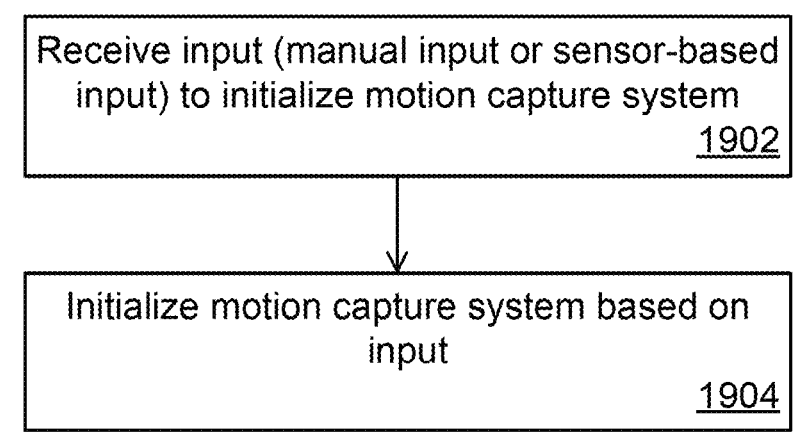
FIG. 19 illustrates an example of a process flow for determining an initializing a motion capture system of virtual production, in accordance with embodiments of the present disclosure.
Figure 20:
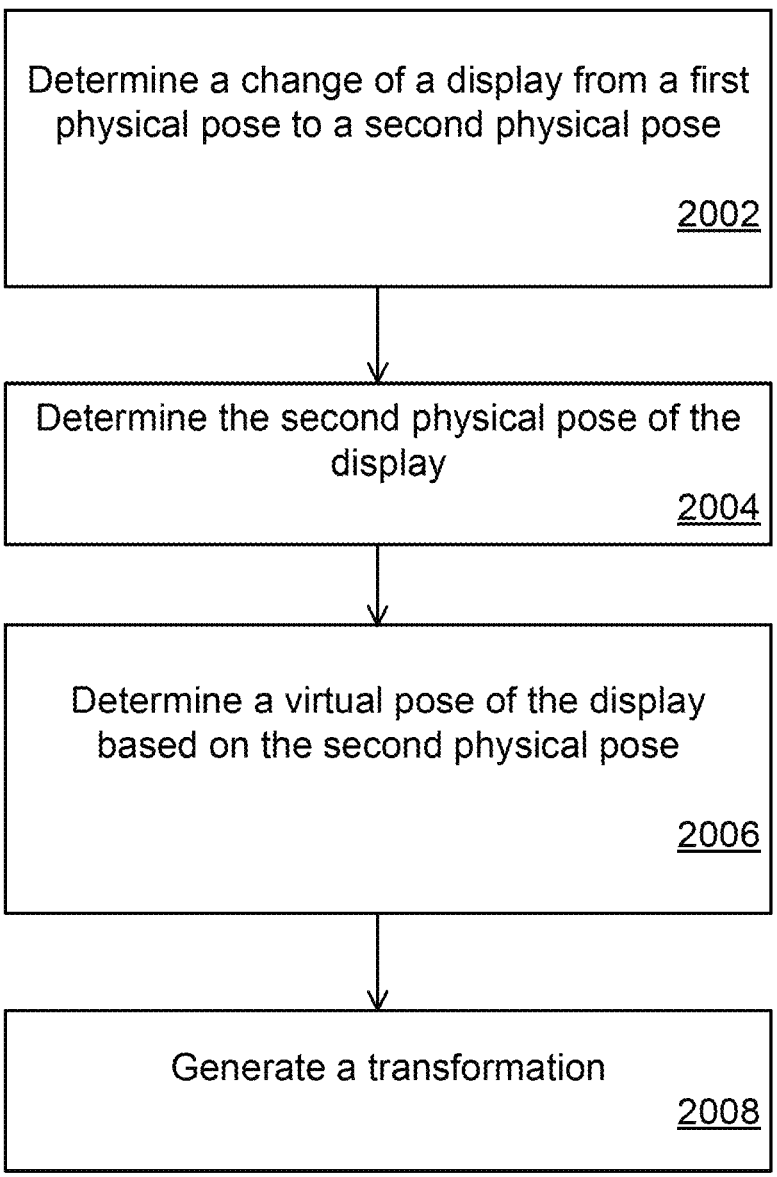
FIG. 20 illustrates an example flow for determining a transformation based on a detecting a movement of a display of a display assembly, in accordance with embodiments of the present disclosure.
Figure 21:
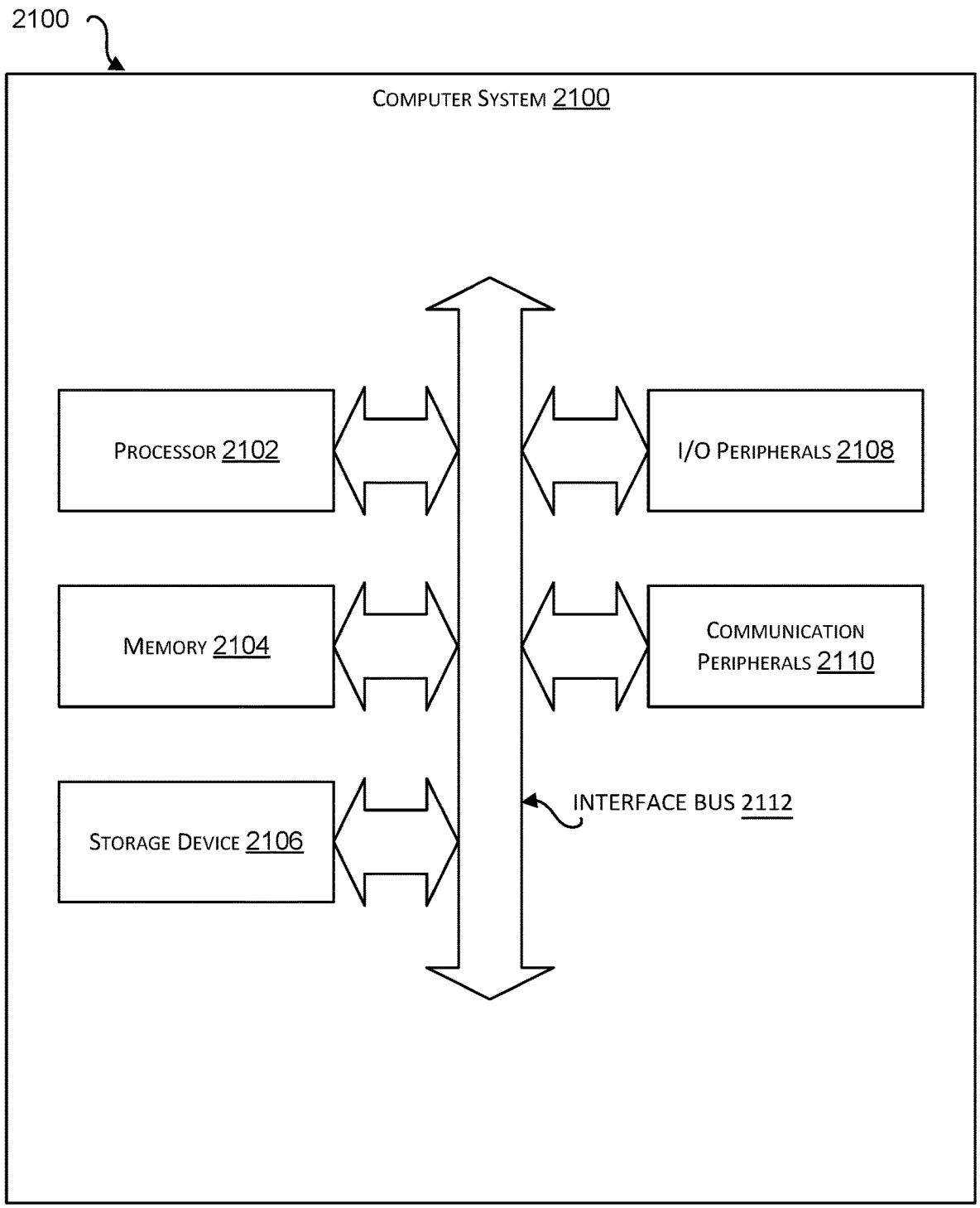
FIG. 21 illustrates example components of a computer system, in accordance with embodiments of the present disclosure.

FIGS. 18-20 describe flows related to updating a virtual model in the context of content rendering that relies on a virtual model of a display assembly on which the content is to be displayed. Operations of the flows can be performed by a computer system (e.g., at least one processor, at least one computer readable memory, etc.), such as the computer system 140 of FIG. 1. Some or all of the instructions for performing the operations can be implemented as hardware circuitry and/or stored as computer-readable instructions on a non-transitory computer-readable medium of the computer system. As implemented, the instructions represent components that include circuitry or code executable by the processor(s) of the computer system. The use of such instructions configures the computer system to perform the specific operations described herein. Each circuitry or code in combination with the relevant processor(s) represents a means for performing a respective operation(s). While the operations are illustrated in a particular order, it should be understood that no particular order is necessary and that one or more operations may be omitted, skipped, performed in parallel, and/or reordered.

FIG. 18 illustrates an example of a process flow 1800 for determining an updated virtual model based on a movement of a display, in accordance with embodiments of the present disclosure. At operation 1802, a computer system can collect motion capture data of a display moving from a first physical pose to a second physical pose. For example, the motion capture data can be generated by a motion capture system associated with a virtual production and sent to the computer system. The motion capture data can track a pose of a virtual marker on a display that has been moved from a first physical pose to a second physical pose. The computer system can use one or more characteristics of the virtual marker to determine a presentation pose of the virtual marker. The presentation pose can correspond to the physical pose of the display. For example, a production crew can use an actuator to move the display from the first pose to the second pose to generate a desired effect for content rendered on the display assembly.

At operation 1804, the computer system can process the motion capture data to determine the physical pose of the display that has been moved. The processing can depend on the collection technique. In an example of using a virtual marker, the motion capture data can be used to determine the physical coordinates of the display in the coordinate system of a camera of the motion capturing system. For example, the computer system can use a PnP pose algorithm to determine the physical pose (physical coordinates in a coordinate system of the motion capturing system) of the display that has been moved.

At operation 1806, the computer system can generate a transformation of the second physical pose of the display to a virtual pose of the display. In one example, the virtual poses of the virtual model and the physical pose of the display that has been moved are used to generate inputs to a fitting model that then outputs parameters of the transformation, where the transformation is associated with the display assembly.

At operation 1808, the computer system can update a virtual model comprising the virtual pose. For example, the computer system can update a virtual model determined prior to the movement of the display to comprise the virtual pose of the display. The updated virtual model can include a virtual pose corresponding to the second physical pose of the display that has been moved.

At operation 1810, the computer system can render content of the display assembly using the updated virtual model. The updated virtual model can be used by a game engine executing on the computer system to render the content, where the rendered content is then displayed by the display assembly.

FIG. 19 illustrates an example of a process flow 1900 for determining an initializing a motion capture system of virtual production, in accordance with embodiments of the present disclosure. In an example, the flow 1900 may start at operation 1902, where the computer system receives an input to initialize a motion capturing system. The input can be a user-based manual input or a sensor-based input. The user-based manual input can be received based on a user operating a switch that generates control instructions to initialize the motion capturing system.

Alternatively, the input can be a sensor-based input. A virtual production can include one or more sensors that collect streaming data from the display assembly. The streaming data can be received by the computer system, which can analyze the streaming data to determine whether there is an indication that one or more displays of a display assembly have moved. The indication can be determined based on detecting a change point in the streaming data. For example, the computer system can use a forgetting factor-based change point detection algorithm to detect a first change point and a second change point in the streaming data. The first change point can represent an indication that the display has begun moving. The second change point can represent an indication that the display has stopped moving.

At operation 1904, the computer system can initialize the motion capturing system, which can include determining a location and orientation (e.g., based on a coordinate system of the motion capturing system) of each motion capturing device of the system and configuring the device for capturing display motion (e.g., configuring the frame rate).

In some embodiments, the motion capturing system captures a frame that includes the display after the display has been moved. For example, if the input is the sensor-based input, the motion capturing system can capture a frame after the second point. In other embodiments, the motion capturing system can capture images from the display from when the display started moving to when the display ceases to move.

FIG. 20 illustrates an example flow 2000 for determining a transformation based on detecting a movement of a display of a display assembly, in accordance with embodiments of the present disclosure. In an example, the flow may start at operation 2002, where the computer system determines that a display of a display assembly has changed from having a first physical pose to a second physical pose. The display can be moved, for example, by an actuator based on a desire of a production crew of a virtual production. The computer system can determine the change to the second pose based on processing motion data received from a motion capturing system.

At operation 2004, the computer system can determine the second physical pose (e.g, physical coordinates in a coordinate system of the motion capturing system) of the display that has been moved. The second physical pose can be determined based on motion data of a virtual tracker and/or image data of a virtual tracker. In particular, display indices of these displays are used to look up and retrieve the corresponding physical position data.

At operation 2006, the computer system can determine a virtual pose that corresponds to the second physical pose of the display.

At operation 2008, the computer system can generate a transformation. For example, the virtual pose corresponding to the second physical pose and a virtual model determined prior to the movement of the display are input to a fitting model that then outputs parameters of the transformation. The output parameters can further be used to update the virtual model.

FIG. 12 illustrates example components of a computer system 2100, in accordance with embodiments of the present disclosure. The computer system 2100 is an example of the computer system 140 of FIG. 1. Although the components of the computer system 2100 are illustrated as belonging to a same computer system 2100, the computer system 2100 can also be distributed (e.g., between multiple user devices).

The computer system 2100 includes at least a processor 2102, a memory 2104, a storage device 2106, input/output peripherals (I/O) 2108, communication peripherals 2110, and an interface bus 2112. The interface bus 2112 is configured to communicate, transmit, and transfer data, controls, and commands among the various components of the computer system 2100. The memory 2104 and the storage device 2106 include computer-readable storage media, such as RAM; ROM; electrically erasable programmable read-only memory (EEPROM); hard drives; CD-ROMs; optical storage devices; magnetic storage devices; electronic non-volatile computer storage, for example, Flash® memory; and other tangible storage media. Any of such computer readable storage media can be configured to store instructions or program codes embodying aspects of the disclosure. The memory 2104 and the storage device 2106 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 2100.

Further, the memory 2104 includes an operating system, programs, and applications. The processor 2102 is configured to execute the stored instructions and includes, for example, a logical processing unit, a microprocessor, a digital signal processor, and other processors. The memory 2104 and/or the processor 2102 can be virtualized and can be hosted within another computer system of, for example, a cloud network or a data center. The I/O peripherals 2108 include user interfaces, such as a keyboard; screen (e.g., a touch screen); microphone; speaker; other input/output devices; and computing components, such as graphical processing units; serial ports; parallel ports; universal serial buses; and other input/output peripherals. The I/O peripherals 2108 are connected to the processor 2102 through any of the ports coupled to the interface bus 2112. The communication peripherals 2110 are configured to facilitate communication between the computer system 2100 and other systems over a communications network and include, for example, a network interface controller, modem, wireless and wired interface cards, antenna, and other communication peripherals.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-implemented method comprising:
   receiving, by at least one processor, motion capture data of a display of a plurality of displays, the display moving from a first physical pose to a second physical pose;
   processing, by the at least one processor, the motion capture data to determine coordinates of the second physical pose;
   generating, by the at least one processor, a transformation of the second physical pose of the display to a virtual pose of the display;
   updating, by the at least one processor, a virtual model of the plurality of displays, the virtual model comprising the virtual pose of the display; and
   rendering, by the at least one processor, content on the display based on the updated virtual model.

2. The computer-implemented method of claim 1, wherein the computer-implemented method further comprises:
   receiving an input to initialize a motion capturing system to generate the motion capture data, the motion capturing system comprising a motion capture device; and
   initializing the motion capturing system based on the input, wherein initializing the motion capturing system comprises determining a location and orientation of the motion capture device.

3. The computer-implemented method of claim 2, wherein the input is a user-based input, and wherein the computer-implemented method further comprises:
   projecting a virtual marker on the display based on receiving the user-based input;
   determining a presentation pose of the virtual marker, the presentation pose corresponding to the second physical pose; and
   determining the coordinates of the second physical pose based on the presentation pose.

4. The computer-implemented method of claim 2, wherein the input is a sensor based input, and wherein the computer-implemented method further comprises:
   receiving streaming data from a sensor configured to collect data associated with the display;
   detecting a first change point and a second change point from the streaming data;
   determining that the display is in the second physical pose based on detecting the second change point; and
   processing the motion capture data to determine the coordinates of the second physical pose based on the determination that the display is in the second physical pose.

5. The computer-implemented method of claim 4, wherein the first change point and the second change point are detected using a forgetting factor-based change point detection algorithm.

6. The computer-implemented method of claim 4, wherein determining the coordinates of the second physical pose comprises using a perspective-n-point (PnP) pose computation algorithm.

7. The computer-implemented method of claim 4, wherein determining the coordinates of the second physical pose comprises determining the coordinates in a coordinate system of a motion capture device used to capture the motion capture data.

8. The computer-implemented method of claim 4, wherein the computer-implemented method further comprises:
   starting reception the motion capture data based on detecting the first change point; and
   while the display is moving:
      continuing to receive the motion capture data;
      processing the motion capture data continuously to determine current coordinates of the display;
      generating a current transformation using the current coordinates of the display; and
      updating the virtual model of the plurality of displays comprising a current virtual pose of the display, the current virtual pose being associated with the current coordinates of the display.

9. A system comprising:
   one or more processors; and
   one or more memory storing instructions that, upon execution by the one or more processors, configure the system to:
      receive motion capture data of a display of a plurality of displays moving from a first physical pose to a second physical pose;
      process the motion capture data to determine coordinates of the second physical pose;
      generate a transformation of the second physical pose of the display to a virtual pose of the display;

update a virtual model of the plurality of displays comprising the virtual pose of the display; and render content on the display based on the updated virtual model.

10. The system of claim 9, wherein the instructions, upon execution by the one or more processors, further configure the system to:

receive an input to initialize a motion capturing system to capture the motion capture data, the motion capturing system comprising a motion capture device; and initialize the motion capturing system based on the input, wherein initializing the motion capturing system comprises determining a location and orientation of the motion capture device.

11. The system of claim 10, wherein the input is a user-based input, and wherein the instructions, upon execution by the one or more processors, further configure the system to:

project a virtual marker on the display based on receiving the user-based input;

determine a presentation pose of the virtual marker, the presentation pose corresponding to the second physical pose; and determine the coordinates of the second physical pose based on the presentation pose.

12. The system of claim 11, wherein the motion capturing system comprises at least one motion capturing device, and wherein the virtual marker comprises a plurality of virtual points projected on the display, the at least one motion capturing device configured to capture motion capture data based on tracking the plurality of virtual points.

13. The system of claim 11, wherein the motion capturing system comprises a plurality of motion capturing devices, and wherein the virtual marker comprises at least one virtual point, the plurality of motion capturing devices configured to capture motion capture data based on tracking the at least one virtual point.

14. The system of claim 11, wherein the virtual marker covers a portion of the display, and wherein a remaining portion of the display projects a portion of a scene.

15. The system of claim 11, wherein the virtual marker covers an entirety of the display.

16. The system of claim 11, wherein the instructions, upon execution by the one or more processors, further configure the system to:

start to receive the motion capture data based on detecting a first change point; and while the display is moving:
continue to receive the motion capture data;
process the motion capture data continuously to determine current coordinates of the display;
generate a current transformation using the current coordinates of the display; and
generate a current virtual model of the plurality of displays comprising a current virtual pose of the display, the current virtual pose being associated with the current coordinates of the display.

17. One or more non-transitory computer-readable storage media storing instructions that, upon execution on a system, cause the system to perform operations comprising:

receiving motion capture data of a display of a plurality of displays moving from a first physical pose to a second physical pose;

processing the motion capture data to determine coordinates of the second physical pose;

generating a transformation of the second physical pose of the display to a virtual pose of the display;

updating a virtual model of the plurality of displays comprising the virtual pose of the display; and rendering content on the display based on the updated virtual model.

18. The one or more non-transitory computer-readable storage media of claim 17, wherein the operations further comprise:

receiving an input to initialize a motion capturing system to capture the motion capture data, the motion capturing system comprising a motion capture device; and initializing the motion capturing system based on the input, wherein initializing the motion capturing system comprises determining a location and orientation of the motion capture device.

19. The one or more non-transitory computer-readable storage media of claim 18, wherein the operations further comprise:

projecting a virtual marker on the display based on receiving the user-based input;

determining a presentation pose of the virtual marker, the presentation pose corresponding to the second physical pose; and determining the coordinates of the second physical pose based on the presentation pose.

20. The one or more non-transitory computer-readable storage media of claim 18, wherein the input is a user-based input, and wherein the operations further comprise:

receiving streaming data from a sensor configured to collect data associated with the display;

detecting a first change point and a second change point from the streaming data;

determining that the display is in the second physical pose based on detecting the second change point; and processing the motion capture data to determine the coordinates of the second physical pose based on the determination that the display is in the second physical pose.

21. A computer-implemented method comprising:

determining, by at least one processor, a first pose of a first display of a plurality of displays included in a display assembly, wherein the display assembly is configured to display content on the plurality of displays;

determining, by the at least one processor, a virtual model of the display assembly, wherein the virtual model is stored in a computer readable memory and comprises a virtual representation of each one of the plurality of displays;

determining, by the at least one processor, a transformation based on the first pose of the first display and on a first virtual representation of the first display in the virtual model; and rendering, by the at least one processor, the content on at least some displays of the plurality of displays according to the transformation and the virtual model.

22. The computer-implemented method of claim 21, wherein determining the first pose further comprises:

receiving, by the at least one processor, first motion capture data of a physical marker placed at a first location over the first display, wherein the first pose is determined based on the first motion capture data.

23. The computer-implemented method of claim 22, wherein determining the first pose further comprises:

receiving, by the at least one processor, second motion capture data of the physical marker placed at a second location over a second display according to a predefined motion path of the physical marker on the display assembly;

determining, by the at least one processor, a change between the first motion capture data and the second motion capture data;

determining, by the at least one processor, that the first motion capture data corresponds to the first location based on the change;

determining, by the at least one processor, a position and a rotation of the physical marker at the first location based on the first motion capture data; and generating, by the at least one processor, the first pose of the first display by including the position and the rotation in the first pose.

24. The computer-implemented method of claim 23, wherein determining the first pose further comprises:

determining, by the at least one processor, a timing of the first motion capture data; and determining, by the at least one processor based on the predefined motion path, that the timing corresponds to the first location.

25. The computer-implemented method of claim 21, wherein determining the first pose further comprises:

displaying, by the at least one processor, a virtual marker on the first display; and receiving, by the at least one processor, motion capture data of the virtual marker, wherein the first pose is determined based on the motion capture data.

26. The computer-implemented method of claim 25, wherein determining the first pose further comprises:

displaying, by the at least one processor, a display identifier on the first display; and determining, by the at least one processor, that the motion capture data corresponds to the first display based on the display identifier on the first display.

27. The computer-implemented method of claim 21, further comprising:

determining, by the at least one processor, a second pose of a second display of the plurality of displays, wherein the transformation is determined further based on the second pose and a second virtual representation of the second display in the virtual model.

28. The computer-implemented method of claim 21, further comprising:

determining, by the at least one processor, poses each corresponding to one of the plurality of displays, wherein the transformation is determined further based on the poses and the virtual representations of the plurality of displays in the virtual model.

29. The computer-implemented method of claim 28, wherein the virtual representations indicate virtual poses each corresponding to one of the plurality of displays, wherein the transformation is determined by at least fitting the poses of the plurality of displays with the virtual poses indicated by the virtual model.

30. The computer-implemented method of claim 21, wherein the plurality of displays includes a first subset of first displays that are within a field of view of a camera device, wherein the content is rendered further based on the field of view, and wherein the computer-implemented method further comprises:

determining, by the at least one processor, first poses each corresponding to one of the first displays; and determining, by the at least one processor from the virtual model, first virtual representations each corresponding to one of the first displays, wherein the transformation is determined further based on the first poses and the first virtual representations.

31. The computer-implemented method of claim 30, wherein the plurality of displays includes a second subset of second displays that are outside of the field of view of the camera device, and wherein the transformation is determined independently of second poses of the second displays and of second virtual representations of the second displays in the virtual model.

32. The computer-implemented method of claim 21, further comprising:

generating, by the at least one processor, an updated virtual model by using the transformation to correct pose errors of the virtual model, wherein the content is rendered based on the updated virtual model.

33. A system comprising:

one or more processors; and one or more memory storing instructions that, upon execution by the one or more processors, configure the system to:

determine a first pose of a first display of a plurality of displays included in a display assembly, wherein the display assembly is configured to display content on the plurality of displays;

determine a virtual model of the display assembly, wherein the virtual model is stored in the one or more memory and comprises a virtual representation of each one of the plurality of displays;

determine a transformation based on the first pose of the first display and on a first virtual representation of the first display in the virtual model; and render the content on at least some displays of the plurality of displays according to the transformation and the virtual model.

34. The system of claim 33, wherein the execution of the instructions further configures the system to:

receive motion capture data of a motion capture system configured to track motion of a physical marker according to a predefined motion path on the display assembly, wherein the motion capture data comprises first motion capture data that corresponds to the physical marker being placed at a first location over the first display, and wherein the first pose is determined based on the first motion capture data.

35. The system of claim 34, wherein the motion capture data comprises second motion capture data that corresponds to the physical marker being placed at a second location over a second display of the display assembly, wherein the execution of the instructions further configures the system to:

determine a change between the first motion capture data and the second motion capture data;

determine that the first motion capture data corresponds to the first location based on the change;

determine a position and a rotation of the physical marker at the first location based on the first motion capture data; and generate the first pose of the first display by including the position and the rotation in the first pose.

36. The system of claim 35, wherein the execution of the instructions further configures the system to:

determine a timing of the first motion capture data; and determine, based on the predefined motion path, that the timing corresponds to the first location.

37. One or more non-transitory computer-readable storage media storing instructions that, upon execution on a system, cause the system to perform operations comprising:
- determining a first pose of a first display of a plurality of displays included in a display assembly, wherein the display assembly is configured to display content on the plurality of displays;
- determining a virtual model of the display assembly, wherein the virtual model is stored in a computer-readable memory and comprises a virtual representation of each one of the plurality of displays;
- determining a transformation based on the first pose of the first display and on a first virtual representation of the first display in the virtual model; and
- rendering the content on at least some displays of the plurality of displays according to the transformation and the virtual model.

38. The one or more non-transitory computer-readable storage media of claim 37, wherein the operations further comprise:
- determining poses each corresponding to one of the plurality of displays, wherein the transformation is determined further based on the poses and the virtual representations of the plurality of displays in the virtual model.

39. The one or more non-transitory computer-readable storage media of claim 37, wherein the plurality of displays includes a first subset of first displays that are within a field of view of a camera device, wherein the content is rendered further based on the field of view, and wherein the operations further comprise:
- determining first poses each corresponding to one of the first displays; and
- determining, from the virtual model, first virtual representations each corresponding to one of the first displays, wherein the transformation is determined further based on the first poses and the first virtual representations.

40. The one or more non-transitory computer-readable storage media of claim 37, wherein the operations further comprise:
- generating an updated virtual model by using the transformation to correct pose errors of the virtual model, wherein the content is rendered based on the updated virtual model.

* * * * *